US012254508B1

(12) United States Patent
Robertson et al.

(10) Patent No.: US 12,254,508 B1
(45) Date of Patent: **\*Mar. 18, 2025**

(54) SYSTEM AND METHOD OF MAPPING PRODUCT ATTRIBUTES BETWEEN DIFFERENT SCHEMAS

(71) Applicant: Overstock.com, Inc., Midvale, UT (US)

(72) Inventors: Ian Robertson, Salt Lake City, UT (US); John Dettmer, Salt Lake City, UT (US); Heath Eldeen, Salt Lake City, UT (US); Greg Heckenberg, Salt Lake City, UT (US); Dan Harris, Salt Lake City, UT (US); Nariman Noursalehi, Salt Lake City, UT (US); Steve Culy, Salt Lake City, UT (US); Giri Vislawath, Sandy, UT (US); Cameron Roe, Salt Lake City, UT (US)

(73) Assignee: Overstock.com, Inc., Midvale, UT (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/136,179

(22) Filed: Apr. 18, 2023

Related U.S. Application Data

(63) Continuation of application No. 17/074,777, filed on Oct. 20, 2020, now Pat. No. 11,631,124, which is a
(Continued)

(51) Int. Cl.
*G06Q 30/00* (2023.01)
*G06F 16/22* (2019.01)
(Continued)

(52) U.S. Cl.
CPC ..... *G06Q 30/0641* (2013.01); *G06F 16/2282* (2019.01); *G06F 16/24575* (2019.01); *G06Q 30/0601* (2013.01); *G06Q 30/0623* (2013.01)

(58) Field of Classification Search
CPC .......... G06Q 30/0641; G06Q 30/0601; G06Q 30/0623; G06F 16/2282; G06F 16/24575
See application file for complete search history.

(56) References Cited

U.S. PATENT DOCUMENTS

| 3,573,747 A | 4/1971 | Adams et al. |
| 3,581,072 A | 5/1971 | Nymeyer |

(Continued)

FOREIGN PATENT DOCUMENTS

| CA | 2253543 | 3/1997 |
| CA | 2347812 | 5/2000 |

(Continued)

OTHER PUBLICATIONS

"A Query Interface Matching Approach Based on Extended Evidence Theory for Deep Webb," by Dong YQ, Li QZ, Ding YH et al. Journal of Computer Science and Technology, 25(3): 537-547, May 2010 (Year: 2010).*

(Continued)

*Primary Examiner* — Anne M Georgalas
(74) *Attorney, Agent, or Firm* — Clayton Howarth, P.C.

(57) ABSTRACT

A system is described for mapping product attributes between schemas of e-commerce websites. Using a predefined reverse mapping, a mapping server populates a master attribute table from product attributes and taxonomy categorizations defined in a source schema. Using a predefined assignment mapping, the mapping server maps the master attributes in the master attribute table to product attributes and taxonomy categorizations in the target schema.

13 Claims, 7 Drawing Sheets

Related U.S. Application Data continuation of application No. 14/861,806, filed on Sep. 22, 2015, now Pat. No. 10,810,654, which is a continuation-in-part of application No. 14/271,113, filed on May 6, 2014, now abandoned.

(60) Provisional application No. 61/820,064, filed on May 6, 2013.

(51) Int. Cl.
  *G06F 16/2457* (2019.01)
  *G06Q 30/0601* (2023.01)

(56) References Cited

U.S. PATENT DOCUMENTS

| | | |
|---|---|---|
| 4,412,287 A | 10/1983 | Braddock, III |
| 4,674,044 A | 6/1987 | Kalmus et al. |
| 4,677,552 A | 6/1987 | Sibley, Jr. |
| 4,789,928 A | 12/1988 | Fujisaki |
| 4,799,156 A | 1/1989 | Shavit et al. |
| 4,808,987 A | 2/1989 | Takeda et al. |
| 4,823,265 A | 4/1989 | Nelson |
| 4,854,516 A | 8/1989 | Yamada |
| 4,903,201 A | 2/1990 | Wagner |
| RE33,316 E | 8/1990 | Katsuta et al. |
| 5,027,110 A | 6/1991 | Chang et al. |
| 5,053,956 A | 10/1991 | Donald et al. |
| 5,063,507 A | 11/1991 | Lindsey et al. |
| 5,077,665 A | 12/1991 | Silverman et al. |
| 5,101,353 A | 3/1992 | Lupien et al. |
| 5,136,501 A | 8/1992 | Silverman et al. |
| 5,168,446 A | 12/1992 | Wiseman |
| 5,205,200 A | 4/1993 | Wright |
| 5,243,515 A | 9/1993 | Lee |
| 5,258,908 A | 11/1993 | Hartheimer et al. |
| 5,280,422 A | 1/1994 | Moe et al. |
| 5,297,031 A | 3/1994 | Gutterman et al. |
| 5,297,032 A | 3/1994 | Trojan et al. |
| 5,301,350 A | 4/1994 | Rogan et al. |
| 5,305,200 A | 4/1994 | Hartheimer et al. |
| 5,325,297 A | 6/1994 | Bird et al. |
| 5,329,589 A | 7/1994 | Fraser et al. |
| 5,347,632 A | 9/1994 | Filepp et al. |
| 5,375,055 A | 12/1994 | Togher et al. |
| 5,377,354 A | 12/1994 | Scannell et al. |
| 5,394,324 A | 2/1995 | Clearwater |
| 5,407,433 A | 4/1995 | Loomas |
| 5,411,483 A | 5/1995 | Loomas et al. |
| 5,426,281 A | 6/1995 | Abecassis |
| 5,485,510 A | 1/1996 | Colbert |
| 5,493,677 A | 2/1996 | Balogh et al. |
| 5,553,145 A | 9/1996 | Micali |
| 5,557,728 A | 9/1996 | Garrett et al. |
| 5,579,471 A | 11/1996 | Barber et al. |
| 5,596,994 A | 1/1997 | Bro |
| 5,598,557 A | 1/1997 | Doner et al. |
| 5,621,790 A | 4/1997 | Grossman et al. |
| 5,640,569 A | 6/1997 | Miller et al. |
| 5,657,389 A | 8/1997 | Houvener |
| 5,664,111 A | 9/1997 | Nahan et al. |
| 5,664,115 A | 9/1997 | Fraser |
| 5,689,652 A | 11/1997 | Lupien et al. |
| 5,694,546 A | 12/1997 | Reisman |
| 5,706,457 A | 1/1998 | Dwyer et al. |
| 5,710,889 A | 1/1998 | Clark et al. |
| 5,715,314 A | 2/1998 | Payne et al. |
| 5,715,402 A | 2/1998 | Popolo |
| 5,717,989 A | 2/1998 | Tozzoli et al. |
| 5,721,908 A | 2/1998 | Lagarde et al. |
| 5,722,418 A | 3/1998 | Bro |
| 5,727,165 A | 3/1998 | Ordish et al. |
| 5,737,599 A | 4/1998 | Rowe et al. |
| 5,760,917 A | 6/1998 | Sheridan |
| 5,761,496 A | 6/1998 | Hattori |
| 5,761,655 A | 6/1998 | Hoffman |
| 5,761,662 A | 6/1998 | Dasan |
| 5,771,291 A | 6/1998 | Newton et al. |
| 5,771,380 A | 6/1998 | Tanaka et al. |
| 5,778,367 A | 7/1998 | Wesinger, Jr. et al. |
| 5,790,790 A | 8/1998 | Smith et al. |
| 5,794,216 A | 8/1998 | Brown |
| 5,794,219 A | 8/1998 | Brown |
| 5,796,395 A | 8/1998 | de Hond |
| 5,799,285 A | 8/1998 | Klingman |
| 5,803,500 A | 9/1998 | Mossberg |
| 5,818,914 A | 10/1998 | Fujisaki |
| 5,826,244 A | 10/1998 | Huberman |
| 5,835,896 A | 11/1998 | Fisher et al. |
| 5,845,265 A | 12/1998 | Woolston |
| 5,845,266 A | 12/1998 | Lupien et al. |
| 5,850,442 A | 12/1998 | Muftic |
| 5,870,754 A | 2/1999 | Dimitrova et al. |
| 5,872,848 A | 2/1999 | Romney et al. |
| 5,873,069 A | 2/1999 | Reuhl et al. |
| 5,873,080 A | 2/1999 | Coden et al. |
| 5,884,056 A | 3/1999 | Steele |
| 5,890,138 A | 3/1999 | Godin et al. |
| 5,890,175 A | 3/1999 | Wong et al. |
| 5,905,975 A | 5/1999 | Ausubel |
| 5,907,547 A | 5/1999 | Foladare et al. |
| 5,913,215 A | 6/1999 | Rubinstein et al. |
| 5,922,074 A | 7/1999 | Richard et al. |
| 5,924,072 A | 7/1999 | Havens |
| 5,926,794 A | 7/1999 | Fethe |
| 5,948,040 A | 9/1999 | DeLorme et al. |
| 5,948,061 A | 9/1999 | Merriman et al. |
| 5,956,640 A | 9/1999 | Eaton et al. |
| 5,970,490 A | 10/1999 | Morgenstern |
| 5,974,396 A | 10/1999 | Anderson et al. |
| 5,974,412 A | 10/1999 | Hazlehurst et al. |
| 5,986,662 A | 11/1999 | Argiro et al. |
| 5,987,446 A | 11/1999 | Corey et al. |
| 5,991,739 A | 11/1999 | Cupps et al. |
| 5,999,915 A | 12/1999 | Nahan et al. |
| 6,012,053 A | 1/2000 | Pant et al. |
| 6,029,141 A | 2/2000 | Bezos et al. |
| 6,035,288 A | 3/2000 | Solomon |
| 6,035,402 A | 3/2000 | Vaeth et al. |
| 6,044,363 A | 3/2000 | Mori et al. |
| 6,045,447 A | 4/2000 | Yoshizawa et al. |
| 6,047,264 A | 4/2000 | Fisher et al. |
| 6,049,797 A | 4/2000 | Guha et al. |
| 6,055,518 A | 4/2000 | Franklin et al. |
| 6,058,379 A | 5/2000 | Odom et al. |
| 6,058,417 A | 5/2000 | Hess et al. |
| 6,058,428 A | 5/2000 | Wang et al. |
| 6,061,448 A | 5/2000 | Smith et al. |
| 6,065,041 A | 5/2000 | Lum et al. |
| 6,070,125 A | 5/2000 | Murphy et al. |
| 6,073,117 A | 6/2000 | Oyanagi et al. |
| 6,078,914 A | 6/2000 | Redfern |
| 6,085,176 A | 7/2000 | Woolston |
| 6,104,815 A | 8/2000 | Alcorn et al. |
| 6,119,137 A | 9/2000 | Smith et al. |
| 6,128,649 A | 10/2000 | Smith et al. |
| 6,141,010 A | 10/2000 | Hoyle |
| 6,167,382 A | 12/2000 | Sparks et al. |
| 6,178,408 B1 | 1/2001 | Copple et al. |
| 6,185,558 B1 | 2/2001 | Bowman et al. |
| 6,192,407 B1 | 2/2001 | Smith et al. |
| 6,199,077 B1 | 3/2001 | Inala et al. |
| 6,202,051 B1 | 3/2001 | Woolston |
| 6,202,061 B1 | 3/2001 | Khosla et al. |
| 6,226,412 B1 | 5/2001 | Schwab |
| 6,243,691 B1 | 6/2001 | Fisher et al. |
| 6,269,238 B1 | 7/2001 | Iggulden |
| 6,271,840 B1 | 8/2001 | Finseth et al. |
| 6,275,820 B1 | 8/2001 | Navin-Chandra et al. |
| 6,275,829 B1 | 8/2001 | Angiulo et al. |
| 6,356,879 B2 | 3/2002 | Aggarwal et al. |
| 6,356,905 B1 | 3/2002 | Gershman et al. |
| 6,356,908 B1 | 3/2002 | Brown et al. |
| 6,366,899 B1 | 4/2002 | Kernz |

(56) References Cited

U.S. PATENT DOCUMENTS

| | | |
|---|---|---|
| 6,370,527 B1 | 4/2002 | Singhal |
| 6,373,933 B1 | 4/2002 | Sarkki et al. |
| 6,374,260 B1 | 4/2002 | Hoffert et al. |
| 6,381,510 B1 | 4/2002 | Amidhozour et al. |
| 6,415,270 B1 | 7/2002 | Rackson et al. |
| 6,415,320 B1 | 7/2002 | Hess et al. |
| 6,434,556 B1 | 8/2002 | Levin et al. |
| 6,452,609 B1 | 9/2002 | Katinsky et al. |
| 6,456,307 B1 | 9/2002 | Bates et al. |
| 6,460,020 B1 | 10/2002 | Pool et al. |
| 6,466,917 B1 | 10/2002 | Goyal et al. |
| 6,484,149 B1 | 11/2002 | Jammes et al. |
| 6,489,968 B1 | 12/2002 | Ortega et al. |
| 6,522,955 B1 | 2/2003 | Colborn |
| 6,523,037 B1 | 2/2003 | Monahan et al. |
| 6,601,061 B1 | 7/2003 | Holt et al. |
| 6,604,107 B1 | 8/2003 | Wang |
| 6,625,764 B1 | 9/2003 | Dawson |
| 6,643,696 B2 | 11/2003 | Davis et al. |
| 6,661,431 B1 | 12/2003 | Stuart et al. |
| 6,665,838 B1 | 12/2003 | Brown et al. |
| 6,675,178 B1 | 1/2004 | Chinchar et al. |
| 6,694,436 B1 | 2/2004 | Audebert |
| 6,701,310 B1 | 3/2004 | Sugiura et al. |
| 6,718,536 B2 | 4/2004 | Dupaquis |
| 6,725,268 B1 | 4/2004 | Jackel et al. |
| 6,728,704 B2 | 4/2004 | Mao et al. |
| 6,732,161 B1 | 5/2004 | Hess et al. |
| 6,732,162 B1 | 5/2004 | Wood et al. |
| 6,785,689 B1 * | 8/2004 | Daniel ............... G06F 16/211 707/999.102 |
| 6,801,909 B2 | 10/2004 | Delgado et al. |
| 6,856,963 B1 | 2/2005 | Hurwitz |
| 6,889,054 B2 | 5/2005 | Himmel et al. |
| 6,907,401 B1 | 6/2005 | Vittal et al. |
| 6,912,505 B2 | 6/2005 | Linden et al. |
| 6,925,307 B1 | 8/2005 | Mamdani et al. |
| 6,978,273 B1 | 12/2005 | Bonneau et al. |
| 7,043,450 B2 | 5/2006 | Velez et al. |
| 7,069,242 B1 | 6/2006 | Sheth et al. |
| 7,076,453 B2 | 7/2006 | Jammes et al. |
| 7,076,504 B1 | 7/2006 | Handel et al. |
| 7,080,030 B2 | 7/2006 | Eglen et al. |
| 7,099,891 B2 | 8/2006 | Harris et al. |
| 7,100,111 B2 | 8/2006 | McElfresh et al. |
| 7,100,195 B2 | 8/2006 | Underwood |
| 7,117,207 B1 | 10/2006 | Kerschberg et al. |
| 7,127,416 B1 | 10/2006 | Tenorio |
| 7,165,091 B2 | 1/2007 | Lunenfeld |
| 7,167,910 B2 | 1/2007 | Farnham et al. |
| 7,216,115 B1 | 5/2007 | Walters et al. |
| 7,240,016 B1 | 7/2007 | Sturgis et al. |
| 7,254,547 B1 | 8/2007 | Beck et al. |
| 7,305,614 B2 | 12/2007 | Chen et al. |
| 7,318,037 B2 | 1/2008 | Solari |
| 7,324,966 B2 | 1/2008 | Scheer |
| 7,340,249 B2 | 3/2008 | Moran et al. |
| 7,349,668 B2 | 3/2008 | Ilan et al. |
| 7,353,188 B2 | 4/2008 | Yim et al. |
| 7,366,755 B2 | 4/2008 | Cuomo et al. |
| 7,379,890 B2 | 5/2008 | Myr et al. |
| 7,380,217 B2 | 5/2008 | Gvelesiani |
| 7,383,320 B1 | 6/2008 | Silberstein et al. |
| 7,401,025 B1 | 7/2008 | Lokitz |
| 7,447,646 B1 | 11/2008 | Agarwal et al. |
| 7,451,476 B1 | 11/2008 | Banks et al. |
| 7,454,464 B2 | 11/2008 | Puthenkulam et al. |
| 7,457,730 B2 | 11/2008 | Degnan |
| 7,493,521 B1 | 2/2009 | Li et al. |
| 7,496,525 B1 | 2/2009 | Mitchell |
| 7,496,527 B2 | 2/2009 | Silverstein et al. |
| 7,496,582 B2 | 2/2009 | Farnham et al. |
| 7,516,094 B2 | 4/2009 | Perkowski |
| 7,539,696 B1 | 5/2009 | Greener et al. |
| 7,546,625 B1 | 6/2009 | Kamangar |
| 7,552,067 B2 | 6/2009 | Nephew et al. |
| 7,565,615 B2 | 7/2009 | Ebert |
| 7,606,743 B2 | 10/2009 | Orzell et al. |
| 7,610,212 B2 | 10/2009 | Klett et al. |
| 7,653,573 B2 | 1/2010 | Hayes, Jr. et al. |
| 7,676,484 B2 * | 3/2010 | Fagin ............... G06F 40/154 707/999.101 |
| 7,834,883 B2 | 11/2010 | Adams |
| 7,904,348 B2 | 3/2011 | Johnson et al. |
| 7,904,349 B1 | 3/2011 | Hart et al. |
| 7,912,748 B1 | 3/2011 | Rosenberg et al. |
| 7,921,031 B2 | 4/2011 | Crysel et al. |
| 7,933,818 B1 | 4/2011 | Kumar et al. |
| 7,941,751 B2 | 5/2011 | Ebert |
| 7,979,340 B2 | 7/2011 | Macdonald Korth et al. |
| 7,983,950 B2 | 7/2011 | De Vita |
| 7,983,963 B2 | 7/2011 | Byrne et al. |
| 7,991,800 B2 | 8/2011 | Lawrence et al. |
| 8,086,643 B1 * | 12/2011 | Tenorio ............ G06Q 10/0875 706/20 |
| 8,095,523 B2 | 1/2012 | Brave et al. |
| 8,112,303 B2 | 2/2012 | Eglen et al. |
| 8,140,989 B2 | 3/2012 | Cohen et al. |
| 8,166,155 B1 | 4/2012 | Rachmeler et al. |
| 8,204,799 B1 | 6/2012 | Murray et al. |
| 8,214,264 B2 | 7/2012 | Kasavin et al. |
| 8,214,804 B2 | 7/2012 | Robertson |
| 8,260,852 B1 | 9/2012 | Cselle |
| 8,265,991 B1 | 9/2012 | Leffert |
| 8,307,012 B2 * | 11/2012 | Thomas ............... G06F 16/86 707/804 |
| 8,312,056 B1 | 11/2012 | Peng et al. |
| 8,326,662 B1 | 12/2012 | Byrne et al. |
| 8,359,245 B1 | 1/2013 | Ballaro et al. |
| 8,370,269 B2 | 2/2013 | MacDonald-Korth et al. |
| 8,370,435 B1 | 2/2013 | Bonefas et al. |
| 8,386,493 B2 * | 2/2013 | Muni ............... G06F 16/214 707/740 |
| 8,392,356 B2 | 3/2013 | Stoner et al. |
| 8,452,691 B2 | 5/2013 | MacDonald Korth et al. |
| 8,473,316 B1 | 6/2013 | Panzitta et al. |
| 8,494,912 B2 | 7/2013 | Fraser et al. |
| 8,498,906 B2 | 7/2013 | Zmolek |
| 8,545,265 B2 | 10/2013 | Sakamoto et al. |
| 8,566,170 B2 | 10/2013 | Joseph et al. |
| 8,577,740 B1 | 11/2013 | Murray et al. |
| 8,583,480 B2 | 11/2013 | Byrne |
| 8,584,149 B2 | 11/2013 | Crucs |
| 8,630,960 B2 | 1/2014 | Gross |
| 8,676,632 B1 | 3/2014 | Watson et al. |
| 8,693,494 B2 | 4/2014 | Fiatal |
| 8,719,075 B2 | 5/2014 | MacDonald Korth et al. |
| 8,793,650 B2 | 7/2014 | Hilerio et al. |
| 8,817,033 B2 | 8/2014 | Hur et al. |
| 9,047,341 B2 | 6/2015 | Pan |
| 9,047,642 B2 | 6/2015 | Byrne et al. |
| 9,123,069 B1 | 9/2015 | Haynes et al. |
| 9,201,558 B1 * | 12/2015 | Dingman ............ G06F 3/048 |
| 9,292,361 B1 | 3/2016 | Chitilian et al. |
| 9,418,365 B2 | 8/2016 | Groarke et al. |
| 9,430,114 B1 | 8/2016 | Dingman et al. |
| 9,448,692 B1 | 9/2016 | Mierau et al. |
| 9,483,788 B2 | 11/2016 | Martin |
| 9,489,681 B2 | 11/2016 | Barous |
| 9,727,891 B2 | 8/2017 | Mezzacca |
| 9,741,080 B1 | 8/2017 | Byrne |
| 9,747,622 B1 | 8/2017 | Johnson et al. |
| 9,805,425 B2 | 10/2017 | MacDonald-Korth et al. |
| 9,928,752 B2 | 3/2018 | Byrne et al. |
| 9,940,659 B1 | 4/2018 | Behbahani et al. |
| 9,954,879 B1 | 4/2018 | Sadaghiani et al. |
| 10,013,500 B1 | 7/2018 | McClintock et al. |
| 10,074,118 B1 | 9/2018 | Johnson et al. |
| 10,102,287 B2 | 10/2018 | Martin |
| 10,210,518 B2 | 2/2019 | Alnajem |
| 10,217,147 B2 | 2/2019 | Shivaswamy et al. |
| 10,269,081 B1 | 4/2019 | Byrne |
| 10,423,997 B2 | 9/2019 | MacDonald Korth et al. |
| 10,534,845 B2 | 1/2020 | Noursalehi et al. |

(56) References Cited

U.S. PATENT DOCUMENTS

| | | |
|---|---|---|
| 10,769,219 B1 | 9/2020 | Martin |
| 10,810,654 B1 | 10/2020 | Robertson et al. |
| 10,853,891 B2 | 12/2020 | MacDonald-Korth et al. |
| 10,872,350 B1 | 12/2020 | Hu et al. |
| 10,896,451 B1 | 1/2021 | Johnson et al. |
| 10,929,890 B2 | 2/2021 | Knab et al. |
| 10,949,876 B2 | 3/2021 | Johnson et al. |
| 10,970,463 B2 | 4/2021 | Noursalehi et al. |
| 10,970,742 B1 | 4/2021 | Knijnik et al. |
| 10,970,769 B2 | 4/2021 | Iqbal |
| 10,977,654 B2 | 4/2021 | Kumar et al. |
| 11,023,947 B1 | 6/2021 | Bosley et al. |
| 11,061,977 B1 | 7/2021 | Raskar |
| 11,062,316 B2 | 7/2021 | Bizarro et al. |
| 11,176,598 B2 | 11/2021 | D'Souza et al. |
| 11,205,179 B1 | 12/2021 | Patel et al. |
| 11,315,145 B1 | 4/2022 | Knijnik et al. |
| 11,463,578 B1 | 10/2022 | De Sanctis et al. |
| 11,475,484 B1 | 10/2022 | Knab et al. |
| 11,514,493 B1 | 11/2022 | Cook et al. |
| 11,526,653 B1 | 12/2022 | Noursalehi et al. |
| 11,593,811 B2 | 2/2023 | Hanis et al. |
| 11,631,124 B1 | 4/2023 | Robertson et al. |
| 11,676,192 B1 | 6/2023 | Moore et al. |
| 11,694,228 B1 | 7/2023 | Hu et al. |
| 11,734,368 B1 | 8/2023 | Campbell et al. |
| 11,928,685 B1 | 3/2024 | Patel et al. |
| 11,972,460 B1 | 4/2024 | Knab et al. |
| 12,093,989 B1 | 9/2024 | Bosley et al. |
| 2001/0002471 A1 | 5/2001 | Ooish |
| 2001/0014868 A1 | 8/2001 | Herz et al. |
| 2001/0034658 A1 | 10/2001 | Silva et al. |
| 2001/0034667 A1 | 10/2001 | Petersen |
| 2001/0034668 A1 | 10/2001 | Whitworth |
| 2001/0044751 A1 | 11/2001 | Pugliese, III et al. |
| 2001/0047290 A1 | 11/2001 | Petras et al. |
| 2001/0047308 A1 | 11/2001 | Kaminsky et al. |
| 2001/0051996 A1 | 12/2001 | Cooper et al. |
| 2002/0002513 A1 | 1/2002 | Chiasson |
| 2002/0007321 A1 | 1/2002 | Burton |
| 2002/0007356 A1 | 1/2002 | Rice et al. |
| 2002/0013721 A1 | 1/2002 | Dabbiere et al. |
| 2002/0019763 A1 | 2/2002 | Linden et al. |
| 2002/0022995 A1 | 2/2002 | Miller et al. |
| 2002/0023059 A1 | 2/2002 | Bari et al. |
| 2002/0026390 A1 | 2/2002 | Ulenas et al. |
| 2002/0029187 A1 | 3/2002 | Meehan et al. |
| 2002/0038312 A1 | 3/2002 | Donner et al. |
| 2002/0040352 A1 | 4/2002 | McCormick |
| 2002/0042738 A1 | 4/2002 | Srinivasan et al. |
| 2002/0049622 A1 | 4/2002 | Lettich et al. |
| 2002/0056044 A1 | 5/2002 | Andersson |
| 2002/0065774 A1 | 5/2002 | Young et al. |
| 2002/0069261 A1 | 6/2002 | Bellare et al. |
| 2002/0082932 A1 | 6/2002 | Chinnappan et al. |
| 2002/0099578 A1 | 7/2002 | Eicher, Jr. et al. |
| 2002/0099579 A1 | 7/2002 | Stowell et al. |
| 2002/0099602 A1 | 7/2002 | Moskowitz et al. |
| 2002/0107718 A1 | 8/2002 | Morrill et al. |
| 2002/0107853 A1 | 8/2002 | Hofmann et al. |
| 2002/0111826 A1 | 8/2002 | Potter et al. |
| 2002/0120537 A1 | 8/2002 | Morea et al. |
| 2002/0120609 A1 | 8/2002 | Lang et al. |
| 2002/0123957 A1 | 9/2002 | Notarius et al. |
| 2002/0124100 A1 | 9/2002 | Adams |
| 2002/0129282 A1 | 9/2002 | Hopkins |
| 2002/0133502 A1 | 9/2002 | Rosenthal et al. |
| 2002/0138399 A1 | 9/2002 | Hayes et al. |
| 2002/0147625 A1 | 10/2002 | Kolke, Jr. |
| 2002/0156802 A1 | 10/2002 | Takayama et al. |
| 2002/0161648 A1 | 10/2002 | Mason et al. |
| 2002/0161664 A1 | 10/2002 | Shaya et al. |
| 2002/0188777 A1 | 12/2002 | Kraft et al. |
| 2002/0194049 A1 | 12/2002 | Boyd |
| 2002/0194357 A1* | 12/2002 | Harris ............ H04L 9/40 707/E17.006 |
| 2002/0198784 A1 | 12/2002 | Shaak et al. |
| 2002/0198882 A1 | 12/2002 | Linden et al. |
| 2003/0004855 A1 | 1/2003 | Dutta et al. |
| 2003/0005046 A1 | 1/2003 | Kavanagh et al. |
| 2003/0007464 A1 | 1/2003 | Balani |
| 2003/0009362 A1 | 1/2003 | Cifani et al. |
| 2003/0009392 A1 | 1/2003 | Perkowski |
| 2003/0014400 A1 | 1/2003 | Siegel |
| 2003/0028451 A1 | 2/2003 | Ananian |
| 2003/0028605 A1 | 2/2003 | Millett et al. |
| 2003/0032409 A1 | 2/2003 | Hutcheson et al. |
| 2003/0035138 A1 | 2/2003 | Schilling |
| 2003/0036914 A1 | 2/2003 | Fitzpatrick et al. |
| 2003/0040970 A1 | 2/2003 | Miller |
| 2003/0041008 A1 | 2/2003 | Grey et al. |
| 2003/0046149 A1 | 3/2003 | Wong |
| 2003/0069740 A1 | 4/2003 | Zeidman |
| 2003/0069790 A1 | 4/2003 | Kane |
| 2003/0069825 A1 | 4/2003 | Hoffman et al. |
| 2003/0083961 A1 | 5/2003 | Bezos et al. |
| 2003/0088467 A1 | 5/2003 | Culver |
| 2003/0088511 A1 | 5/2003 | Karboulonis et al. |
| 2003/0093331 A1 | 5/2003 | Childs et al. |
| 2003/0097352 A1 | 5/2003 | Gutta et al. |
| 2003/0105682 A1 | 6/2003 | Dicker et al. |
| 2003/0110100 A1 | 6/2003 | Wirth, Jr. |
| 2003/0119492 A1 | 6/2003 | Timmins et al. |
| 2003/0131095 A1 | 7/2003 | Kumhyr et al. |
| 2003/0139969 A1 | 7/2003 | Scroggie et al. |
| 2003/0140007 A1 | 7/2003 | Kramer et al. |
| 2003/0140121 A1 | 7/2003 | Adams |
| 2003/0158792 A1 | 8/2003 | Perkowski |
| 2003/0163340 A1 | 8/2003 | Fitzpatrick et al. |
| 2003/0167213 A1 | 9/2003 | Jammes et al. |
| 2003/0167222 A1 | 9/2003 | Mehrotra et al. |
| 2003/0177103 A1 | 9/2003 | Ivanov et al. |
| 2003/0187745 A1 | 10/2003 | Hobday et al. |
| 2003/0200156 A1 | 10/2003 | Roseman et al. |
| 2003/0204449 A1 | 10/2003 | Kotas et al. |
| 2003/0217002 A1 | 11/2003 | Enborg |
| 2003/0220835 A1 | 11/2003 | Barnes, Jr. |
| 2004/0006509 A1 | 1/2004 | Mannik et al. |
| 2004/0015416 A1 | 1/2004 | Foster et al. |
| 2004/0029567 A1 | 2/2004 | Timmins et al. |
| 2004/0041836 A1 | 3/2004 | Zaner et al. |
| 2004/0044563 A1 | 3/2004 | Stein |
| 2004/0055017 A1 | 3/2004 | Delpuch et al. |
| 2004/0058710 A1 | 3/2004 | Timmins et al. |
| 2004/0068697 A1 | 4/2004 | Harik et al. |
| 2004/0073476 A1 | 4/2004 | Donahue et al. |
| 2004/0078388 A1 | 4/2004 | Melman |
| 2004/0093311 A1 | 5/2004 | Chew et al. |
| 2004/0107136 A1 | 6/2004 | Nemirofsky et al. |
| 2004/0117242 A1 | 6/2004 | Conrad et al. |
| 2004/0122083 A1 | 6/2004 | Pettit et al. |
| 2004/0122681 A1 | 6/2004 | Ruvolo et al. |
| 2004/0122735 A1 | 6/2004 | Meshkin |
| 2004/0122855 A1 | 6/2004 | Ruvolo et al. |
| 2004/0128183 A1 | 7/2004 | Challey et al. |
| 2004/0128283 A1 | 7/2004 | Wang et al. |
| 2004/0128320 A1 | 7/2004 | Grove et al. |
| 2004/0143731 A1 | 7/2004 | Audebert et al. |
| 2004/0148232 A1 | 7/2004 | Fushimi et al. |
| 2004/0172323 A1 | 9/2004 | Stamm |
| 2004/0172379 A1 | 9/2004 | Mott et al. |
| 2004/0174979 A1 | 9/2004 | Hutton et al. |
| 2004/0177110 A1 | 9/2004 | Rounthwaite et al. |
| 2004/0186766 A1 | 9/2004 | Fellenstein et al. |
| 2004/0199496 A1 | 10/2004 | Liu et al. |
| 2004/0199905 A1 | 10/2004 | Fagin et al. |
| 2004/0204989 A1 | 10/2004 | Dicker et al. |
| 2004/0204991 A1 | 10/2004 | Monahan et al. |
| 2004/0230989 A1 | 11/2004 | Macey et al. |
| 2004/0240642 A1 | 12/2004 | Crandell et al. |
| 2004/0249727 A1 | 12/2004 | Cook, Jr. et al. |
| 2004/0267717 A1 | 12/2004 | Slackman |
| 2005/0010925 A1 | 1/2005 | Khawand et al. |

(56) References Cited

U.S. PATENT DOCUMENTS

| | | |
|---|---|---|
| 2005/0021666 A1 | 1/2005 | Dinnage et al. |
| 2005/0038733 A1 | 2/2005 | Foster et al. |
| 2005/0044254 A1 | 2/2005 | Smith |
| 2005/0055306 A1 | 3/2005 | Miller et al. |
| 2005/0060664 A1 | 3/2005 | Rogers |
| 2005/0097204 A1 | 5/2005 | Horowitz et al. |
| 2005/0114229 A1 | 5/2005 | Ackley et al. |
| 2005/0120311 A1 | 6/2005 | Thrall |
| 2005/0131837 A1 | 6/2005 | Sanctis et al. |
| 2005/0144064 A1 | 6/2005 | Calabria et al. |
| 2005/0144074 A1 | 6/2005 | Fredregill et al. |
| 2005/0193333 A1 | 9/2005 | Ebert |
| 2005/0197846 A1 | 9/2005 | Pezaris et al. |
| 2005/0197950 A1 | 9/2005 | Moya et al. |
| 2005/0198031 A1 | 9/2005 | Pezaris et al. |
| 2005/0202390 A1 | 9/2005 | Allen et al. |
| 2005/0203888 A1 | 9/2005 | Woosley et al. |
| 2005/0216300 A1 | 9/2005 | Appelman et al. |
| 2005/0240474 A1 | 10/2005 | Li |
| 2005/0262067 A1 | 11/2005 | Lee et al. |
| 2005/0273378 A1 | 12/2005 | MacDonald-Korth et al. |
| 2005/0278231 A1 | 12/2005 | Teeter |
| 2006/0009994 A1 | 1/2006 | Hogg et al. |
| 2006/0010105 A1 | 1/2006 | Sarukkai et al. |
| 2006/0015498 A1 | 1/2006 | Sarmiento et al. |
| 2006/0031240 A1 | 2/2006 | Eyal et al. |
| 2006/0041638 A1 | 2/2006 | Whittaker et al. |
| 2006/0048093 A1 | 3/2006 | Jain et al. |
| 2006/0058048 A1 | 3/2006 | Kapoor et al. |
| 2006/0069623 A1 | 3/2006 | MacDonald Korth et al. |
| 2006/0085251 A1 | 4/2006 | Greene |
| 2006/0136320 A1 | 6/2006 | Saberi et al. |
| 2006/0173817 A1 | 8/2006 | Chowdhury et al. |
| 2006/0206386 A1 | 9/2006 | Walker et al. |
| 2006/0206479 A1 | 9/2006 | Mason |
| 2006/0212358 A1 | 9/2006 | Walker et al. |
| 2006/0218049 A1 | 9/2006 | Walker et al. |
| 2006/0224470 A1 | 10/2006 | Garcia Ruano et al. |
| 2006/0230035 A1 | 10/2006 | Bailey et al. |
| 2006/0235752 A1 | 10/2006 | Kavanagh et al. |
| 2006/0253476 A1* | 11/2006 | Roth ................ G06F 40/12 |
| 2006/0259360 A1 | 11/2006 | Flinn et al. |
| 2006/0271671 A1 | 11/2006 | Hansen |
| 2006/0282304 A1 | 12/2006 | Bedard et al. |
| 2007/0005424 A1 | 1/2007 | Arauz |
| 2007/0027760 A1 | 2/2007 | Collins et al. |
| 2007/0027814 A1 | 2/2007 | Tuoriniemi |
| 2007/0055568 A1 | 3/2007 | Osborne |
| 2007/0073641 A1 | 3/2007 | Perry et al. |
| 2007/0077025 A1 | 4/2007 | Mino |
| 2007/0078726 A1 | 4/2007 | MacDonald Korth et al. |
| 2007/0078849 A1 | 4/2007 | Slothouber |
| 2007/0083437 A1 | 4/2007 | Hamor |
| 2007/0094597 A1 | 4/2007 | Rostom |
| 2007/0100803 A1 | 5/2007 | Cava |
| 2007/0130090 A1 | 6/2007 | Staib et al. |
| 2007/0160345 A1 | 7/2007 | Sakai et al. |
| 2007/0162379 A1 | 7/2007 | Skinner |
| 2007/0174108 A1 | 7/2007 | Monster |
| 2007/0192168 A1 | 8/2007 | Van Luchene |
| 2007/0192181 A1 | 8/2007 | Asdourian |
| 2007/0206606 A1 | 9/2007 | Coleman et al. |
| 2007/0214048 A1 | 9/2007 | Chan et al. |
| 2007/0226679 A1 | 9/2007 | Jayamohan et al. |
| 2007/0233565 A1 | 10/2007 | Herzog et al. |
| 2007/0239534 A1 | 10/2007 | Liu et al. |
| 2007/0245013 A1 | 10/2007 | Saraswathy et al. |
| 2007/0260520 A1 | 11/2007 | Jha et al. |
| 2007/0282666 A1 | 12/2007 | Afeyan et al. |
| 2007/0288298 A1 | 12/2007 | Gutierrez et al. |
| 2007/0299743 A1 | 12/2007 | Staib et al. |
| 2008/0010678 A1 | 1/2008 | Burdette et al. |
| 2008/0015938 A1 | 1/2008 | Haddad et al. |
| 2008/0021763 A1 | 1/2008 | Merchant |
| 2008/0027809 A1 | 1/2008 | Storm |
| 2008/0052152 A1 | 2/2008 | Yufik |
| 2008/0071640 A1 | 3/2008 | Nguyen |
| 2008/0082394 A1 | 4/2008 | Floyd et al. |
| 2008/0103893 A1 | 5/2008 | Nagarajan et al. |
| 2008/0120342 A1 | 5/2008 | Reed et al. |
| 2008/0126205 A1 | 5/2008 | Evans et al. |
| 2008/0126476 A1 | 5/2008 | Nicholas et al. |
| 2008/0133305 A1 | 6/2008 | Yates et al. |
| 2008/0133349 A1 | 6/2008 | Nazer et al. |
| 2008/0140765 A1 | 6/2008 | Kelaita et al. |
| 2008/0162574 A1 | 7/2008 | Gilbert |
| 2008/0195476 A1 | 8/2008 | Marchese et al. |
| 2008/0201218 A1 | 8/2008 | Broder et al. |
| 2008/0215456 A1 | 9/2008 | West et al. |
| 2008/0281714 A1 | 11/2008 | Kluth |
| 2008/0288338 A1 | 11/2008 | Wiseman et al. |
| 2008/0294536 A1 | 11/2008 | Taylor et al. |
| 2008/0300909 A1 | 12/2008 | Rikhtverchik et al. |
| 2008/0301009 A1 | 12/2008 | Plaster et al. |
| 2008/0305869 A1 | 12/2008 | Konforty et al. |
| 2008/0313010 A1 | 12/2008 | Jepson et al. |
| 2008/0320012 A1* | 12/2008 | Loving ................ G06F 16/213 |
| 2009/0006190 A1 | 1/2009 | Lucash et al. |
| 2009/0006315 A1* | 1/2009 | Mukherjea ............ G06F 16/367 |
| 2009/0030755 A1 | 1/2009 | Altberg et al. |
| 2009/0030775 A1 | 1/2009 | Vieri |
| 2009/0037355 A1 | 2/2009 | Brave et al. |
| 2009/0089131 A1 | 4/2009 | Moukas et al. |
| 2009/0106080 A1 | 4/2009 | Carrier et al. |
| 2009/0106127 A1 | 4/2009 | Purdy et al. |
| 2009/0110181 A1* | 4/2009 | Koenig ................ H04M 3/2263 379/265.02 |
| 2009/0119167 A1 | 5/2009 | Kendall et al. |
| 2009/0157537 A1 | 6/2009 | Miller |
| 2009/0164323 A1 | 6/2009 | Byrne |
| 2009/0164442 A1 | 6/2009 | Shani et al. |
| 2009/0182589 A1 | 7/2009 | Kendall et al. |
| 2009/0204848 A1 | 8/2009 | Kube et al. |
| 2009/0222337 A1 | 9/2009 | Sergiades |
| 2009/0222348 A1 | 9/2009 | Ransom et al. |
| 2009/0222737 A1 | 9/2009 | Liesche et al. |
| 2009/0228918 A1 | 9/2009 | Rolff et al. |
| 2009/0234722 A1 | 9/2009 | Evevsky |
| 2009/0240582 A1 | 9/2009 | Sheldon-Neal et al. |
| 2009/0276284 A1 | 11/2009 | Yost |
| 2009/0276305 A1 | 11/2009 | Clopp |
| 2009/0292677 A1 | 11/2009 | Kim |
| 2009/0293019 A1 | 11/2009 | Raffel et al. |
| 2009/0313173 A1 | 12/2009 | Singh et al. |
| 2010/0042684 A1 | 2/2010 | Broms et al. |
| 2010/0070448 A1 | 3/2010 | Omoigui |
| 2010/0076816 A1 | 3/2010 | Phillips |
| 2010/0076851 A1 | 3/2010 | Jewell, Jr. |
| 2010/0094673 A1 | 4/2010 | Lobo et al. |
| 2010/0107123 A1 | 4/2010 | Sareen et al. |
| 2010/0145831 A1 | 6/2010 | Esfandiari et al. |
| 2010/0146413 A1 | 6/2010 | Yu |
| 2010/0174754 A1* | 7/2010 | B'Far ................ G06F 16/252 707/794 |
| 2010/0228617 A1 | 9/2010 | Ransom |
| 2010/0274821 A1* | 10/2010 | Bernstein ............ G06F 16/951 707/808 |
| 2011/0010656 A1 | 1/2011 | Mokotov |
| 2011/0035276 A1 | 2/2011 | Ghosh et al. |
| 2011/0055054 A1 | 3/2011 | Glasson |
| 2011/0060621 A1 | 3/2011 | Weller et al. |
| 2011/0103699 A1 | 5/2011 | Ke et al. |
| 2011/0131253 A1 | 6/2011 | Peukert et al. |
| 2011/0137973 A1 | 6/2011 | Wei et al. |
| 2011/0145226 A1 | 6/2011 | Gollapudi et al. |
| 2011/0153383 A1 | 6/2011 | Bhattacharjya et al. |
| 2011/0153663 A1 | 6/2011 | Koren et al. |
| 2011/0173076 A1 | 7/2011 | Eggleston et al. |
| 2011/0191319 A1 | 8/2011 | Nei et al. |
| 2011/0196802 A1 | 8/2011 | Ellis et al. |
| 2011/0225050 A1 | 9/2011 | Varghese |
| 2011/0231226 A1 | 9/2011 | Golden |
| 2011/0231383 A1 | 9/2011 | Smyth et al. |
| 2011/0258049 A1 | 10/2011 | Ramer et al. |

(56) References Cited

U.S. PATENT DOCUMENTS

| | | |
|---|---|---|
| 2011/0258212 A1 | 10/2011 | Lu et al. |
| 2011/0271204 A1 | 11/2011 | Jones et al. |
| 2011/0276513 A1 | 11/2011 | Erhart et al. |
| 2011/0289068 A1 | 11/2011 | Teevan et al. |
| 2012/0005187 A1 | 1/2012 | Chavanne |
| 2012/0030067 A1 | 2/2012 | Pothukuchi et al. |
| 2012/0084135 A1 | 4/2012 | Nissan et al. |
| 2012/0089454 A1 | 4/2012 | Chen |
| 2012/0123899 A1 | 5/2012 | Wiesner |
| 2012/0158480 A1 | 6/2012 | Sundaram |
| 2012/0158715 A1 | 6/2012 | Maghoul et al. |
| 2012/0164619 A1 | 6/2012 | Meer |
| 2012/0166299 A1 | 6/2012 | Heinstein et al. |
| 2012/0203723 A1 | 8/2012 | Huang et al. |
| 2012/0231424 A1 | 9/2012 | Calman et al. |
| 2012/0233312 A1 | 9/2012 | Ramakumar et al. |
| 2012/0239504 A1 | 9/2012 | Curlander et al. |
| 2012/0253985 A1 | 10/2012 | Maron et al. |
| 2012/0271702 A1 | 10/2012 | MacLachlan et al. |
| 2012/0278388 A1 | 11/2012 | Kleinbart et al. |
| 2012/0284336 A1 | 11/2012 | Schmidt et al. |
| 2012/0296697 A1 | 11/2012 | Kumar |
| 2012/0323674 A1 | 12/2012 | Simmons et al. |
| 2012/0323725 A1 | 12/2012 | Johnston et al. |
| 2013/0031470 A1 | 1/2013 | Daly, Jr. et al. |
| 2013/0073392 A1 | 3/2013 | Allen et al. |
| 2013/0080200 A1 | 3/2013 | Connolly et al. |
| 2013/0080426 A1 | 3/2013 | Chen et al. |
| 2013/0085893 A1 | 4/2013 | Bhardwaj et al. |
| 2013/0144870 A1 | 6/2013 | Gupta et al. |
| 2013/0145254 A1 | 6/2013 | Masuko et al. |
| 2013/0151331 A1 | 6/2013 | Avner et al. |
| 2013/0151388 A1 | 6/2013 | Falkenbort et al. |
| 2013/0173408 A1 | 7/2013 | Lindblom |
| 2013/0185164 A1 | 7/2013 | Pottjegort |
| 2013/0191409 A1 | 7/2013 | Zeng et al. |
| 2013/0212487 A1 | 8/2013 | Cote |
| 2013/0246300 A1 | 9/2013 | Fischer et al. |
| 2013/0254059 A1 | 9/2013 | Teo |
| 2013/0268561 A1 | 10/2013 | Christie et al. |
| 2014/0019298 A1 | 1/2014 | Suchet et al. |
| 2014/0019313 A1 | 1/2014 | Hu et al. |
| 2014/0019542 A1 | 1/2014 | Rao et al. |
| 2014/0025509 A1 | 1/2014 | Reisz et al. |
| 2014/0032544 A1 | 1/2014 | Mathieu et al. |
| 2014/0095273 A1 | 4/2014 | Tang et al. |
| 2014/0114680 A1 | 4/2014 | Mills et al. |
| 2014/0114755 A1 | 4/2014 | Mezzacca |
| 2014/0136290 A1 | 5/2014 | Schiestl et al. |
| 2014/0149390 A1 | 5/2014 | Chen et al. |
| 2014/0172652 A1 | 6/2014 | Pobbathi et al. |
| 2014/0180758 A1 | 6/2014 | Agarwal et al. |
| 2014/0200959 A1 | 7/2014 | Sarb et al. |
| 2014/0259056 A1 | 9/2014 | Grusd |
| 2014/0278880 A1 | 9/2014 | Lemphers et al. |
| 2014/0279191 A1 | 9/2014 | Agarwal et al. |
| 2014/0289005 A1 | 9/2014 | Laing et al. |
| 2014/0310094 A1 | 10/2014 | Shapira et al. |
| 2014/0330818 A1 | 11/2014 | Raina et al. |
| 2014/0337090 A1 | 11/2014 | Tavares |
| 2014/0372415 A1 | 12/2014 | Fernandez-Ruiz |
| 2015/0019958 A1 | 1/2015 | Ying et al. |
| 2015/0032507 A1 | 1/2015 | Narasimhan et al. |
| 2015/0088695 A1 | 3/2015 | Lorbiecki et al. |
| 2015/0088968 A1 | 3/2015 | Wei et al. |
| 2015/0089524 A1 | 3/2015 | Cremonesi et al. |
| 2015/0106181 A1 | 4/2015 | Kluth |
| 2015/0142543 A1 | 5/2015 | Lellouche |
| 2015/0142771 A1 | 5/2015 | Bhagat et al. |
| 2015/0161084 A1 | 6/2015 | Long |
| 2015/0286742 A1 | 10/2015 | Zhang et al. |
| 2015/0287066 A1 | 10/2015 | Wortley et al. |
| 2016/0071105 A1 | 3/2016 | Groarke et al. |
| 2016/0098488 A1 | 4/2016 | Battle et al. |
| 2017/0006135 A1 | 1/2017 | Siebel et al. |
| 2017/0076324 A1 | 3/2017 | Waldron |
| 2017/0155631 A1 | 6/2017 | Du |
| 2017/0228375 A1 | 8/2017 | Yang et al. |
| 2017/0235788 A1 | 8/2017 | Borisyuk et al. |
| 2017/0300911 A1 | 10/2017 | Alnajem |
| 2017/0329466 A1 | 11/2017 | Krenkler et al. |
| 2017/0344622 A1 | 11/2017 | Islam et al. |
| 2017/0358000 A1 | 12/2017 | Jain et al. |
| 2018/0033064 A1 | 2/2018 | Varley |
| 2018/0167412 A1 | 6/2018 | Barrett et al. |
| 2018/0191644 A1 | 7/2018 | Campos et al. |
| 2019/0043106 A1 | 2/2019 | Talmor et al. |
| 2019/0066111 A1 | 2/2019 | Bizarro et al. |
| 2019/0130904 A1 | 5/2019 | Homma et al. |
| 2019/0197550 A1 | 6/2019 | Sharma |
| 2019/0295087 A1 | 9/2019 | Jia et al. |
| 2019/0295088 A1 | 9/2019 | Jia et al. |
| 2019/0295089 A1 | 9/2019 | Jia et al. |
| 2019/0325868 A1 | 10/2019 | Lecue et al. |
| 2020/0005310 A1 | 1/2020 | Kumar et al. |
| 2020/0065357 A1 | 2/2020 | Noursalehi et al. |
| 2020/0111135 A1 | 4/2020 | Box et al. |
| 2020/0184540 A1 | 6/2020 | D'Souza et al. |
| 2020/0186879 A1 | 6/2020 | Volinsky et al. |
| 2020/0218766 A1 | 7/2020 | Yaseen et al. |
| 2020/0250675 A1 | 8/2020 | Hanis et al. |
| 2020/0293587 A1 | 9/2020 | Ayers et al. |
| 2020/0410552 A1 | 12/2020 | Stohlman |
| 2022/0335476 A1 | 10/2022 | Abdel-Wahab et al. |
| 2023/0086724 A1 | 3/2023 | Wu et al. |
| 2023/0188792 A1 | 6/2023 | Sahasi et al. |

FOREIGN PATENT DOCUMENTS

| | | |
|---|---|---|
| EP | 0636993 | 4/1999 |
| EP | 0807891 | 5/2000 |
| EP | 1241603 | 9/2002 |
| GB | 2397400 | 7/2004 |
| GB | 2424098 | 9/2006 |
| JP | 2001283083 | 12/2001 |
| JP | 2002318935 | 10/2002 |
| JP | 2007021920 | 2/2007 |
| JP | 2009505238 | 2/2009 |
| WO | WO1997017663 | 5/1997 |
| WO | WO1998032289 | 7/1998 |
| WO | WO1998047082 | 10/1998 |
| WO | WO1998049641 | 11/1998 |
| WO | WO1999059283 | 11/1999 |
| WO | WO2000025218 | 5/2000 |
| WO | WO20000068851 | 11/2000 |
| WO | WO2001009803 | 2/2001 |
| WO | WO2001082135 | 11/2001 |
| WO | WO2001097099 | 12/2001 |
| WO | WO2002037234 | 5/2002 |
| WO | WO2003094080 | 11/2003 |
| WO | WO2007021920 | 2/2007 |
| WO | WO2012093410 | 7/2012 |
| WO | WO2015116038 | 8/2015 |
| WO | WO2015176071 | 11/2015 |

OTHER PUBLICATIONS

Teo, "Organizational Factors of Success in Using EDIS: A Survey of Tradenet Participants," Electronic Markets—The International Journal, Oct. 1993, 2 pages, vol. 3, No. 3.

Tjostheim et al., "A case study of an on-line auction for the World Wide Web," printed from www.nr.no/gem/elcom/puplikasjoner/enter98e.html on Jun. 10, 1990, 10 pages.

Turban, "Auctions and Bidding on the Internet: An Assessment," Electronic Markets—The International Journal, Dec. 1997, 5 pages, vol. 7, No. 4.

ubid.com, "How do I Updated my Address, Phone, Credit Card, Password, etc.?" printed from web.archive.org/web/20010208113903/www.ubid.com/help/topic13asp on Aug. 30, 2007.

ubid.com, "How do I track my shipment?" printed from web.archive.org/web/20010331032659/www.ubid.com/help/topic27.asp on Aug. 30, 2007.

(56) References Cited

OTHER PUBLICATIONS ubid.com, "Can I track all of my bids from My Page?" printed from web.archive.org/web/20010208114049/www.ubid.com/help/topic14.asp on Aug. 30, 2007.

Van Heck et al., "Experiences with Electronic Auctions in the Dutch Flower Industry," Electronic Markets—The International Journal, Dec. 1997, 6 pages, vol. 7, No. 4.

Verizon Wireless, "Verizon Wireless Customers Get It NowSM; Get Games, Get Pix, Get Ring Tones and Get Going in Full Color," press release to PRNEWSWIRE, Sep. 23, 2002.

Warbelow et al., "AUCNET: TV Auction Network System," Harvard Business School 9-190-001, Jul. 19, 1989, Rev. Apr. 12, 1996, pp. 1-15.

Weber, "How Financial Markets are Going On-line," Electronic Markets—The International Journal, Oct. 1993, 2 pages, vol. 3, No. 3.

Wireless Internet, "DailyShopper Selects 2Roam to Enable Mobile Customers to Retrieve Nearby Sales and Promotions Information," Wireless Internet, Apr. 2001.

Wireless Week, "Verizon Wireless Gets Going on BREW Agenda," Wireless Week, Sep. 23, 2002.

xchanger.net, webpage printed from www.auctiva.com/showcases/as_4sale.asp?uid=exchanger, undated but at least as early as Oct. 12, 2000.

Yu et al., "Distributed Reputation Management for Electronic Commerce," Computational Intelligence, 2002, pp. 535-549, vol. 18, No. 4.

Zetmeir, Auction Incentive Marketing, print of all pages of website found at home.earthlink.net/~bidpointz/ made Oct. 8, 2004.

Zimmermann, "Integration of Financial Services: The TeleCounter," Electronic Markets—The International Journal, Oct. 1993, 1 page, vol. 3, No. 3.

Zwass, "Electronic Commerce: Structures and Issues," International Journal of Electronic Commerce, Fall 1996, pp. 3-23, vol. 1, No. 1.

Message Passing from Wikipedia, archived May 6, 2016, retrieved from https://en.wikipedia.org/wiki/message_passing, 4 pages.

Di et al., "A New Implementation for Ontology Mapping Based enterprise Semantic Interoperation," by Xiaofeng Di and Yushun Fan, Applied Mechanics and Materials, vols. 16-19 (2009), pp. 644-648 (Year:2009).

Nicolle et a., "XML Integration and Toolkit for B2B Applications," by Christophe Nicolle, Kokou Yetongnon, and Jean-Claude Simon, Journal of Database Management, Oct.-Dec. 2003 (Year: 2003).

V. Aksakalli, Optimizing direct response in Internet display advertising, Elsevier, vol. 11, Issue 3, May-Jun. 2012, pp. 229-240. (Year: 2012).

Gallagher et al. A framework for targeting banner advertising on the internet. IEEE, pp. 265-274 (Year: 1997).

Alex, Neil, "Optimizing Search Results in Elasticsearch with Scoring and Boosting", Mar. 18, 2015, qbox.io, accessed at [https://qbox.io/blog/optimizing-search-results-in-elasticsearch0with-scoring-and-boosting] (year: 2015).

Hybrid algorithms for recommending new items. Cremonesi et al., ResearchGate, Google, (year:2011).

Dubinsky, B., "Uncovering accounts payable fraud by using 'fuzzy matching logic': Part 1," Business Credit 110.3:6 (4), National Association of Credit Management, Mar. 2008, (Year: 2008).

Dubinsky, B., "Uncovering accounts payable fraud by using 'fuzzy matching logic': Part 2," Business Credit 110.4: 64 (3), National Association of Credit Management, Apr. 2008 (Year:2008).

Qureshi et al. "Taxonomy based Data Marts," by Asiya Abdus Salam Qureshi and Syed Muhammad Khalid Jamal, International Journal of Computer Applications (0975-8887), vol. 60, No. 13, Dec. 2012 (Year: 2012).

Haibin Liu, Vlado Keselj, "Combined mining of Web server logs and web contents for classifying user navigation patterns and predicting users' future requests," Data & Knowledge Engineering, vol. 61, Issue 2, 2007, pp. 304-330 (Year: 2007).

Sumathi et al., "Automatic Recommendation of Web Pages in Web Usage Mining," International Journal on Computer Science and Engineering, vol. 02, No. 09, 2010 (Year: 2010).

Harrington, Caitlin "The Future of Shopping" Wired 26. 12:30. Conde Nast Publications Inc. (Dec. 2018).

Craver, Thom, Inside Bing's Spell Checker, Jan. 4, 2013, searchenginewatch.com, accessed at [https://www.searchenginewatch.com/2013/01/04/inside-beings-spell-checker/] (Year: 2013).

Business Wire [New York] "Data Warehousing Leader Acta Inc. Extends Award-Winning Technology to E-Commerce" Sep. 14, 1999 (Year:1999).

"A Collaborative Recommender Combining Item Rating Similarity and Item Attribute Similarity," Gong et al., IEEE Computer Society 3pgs. (Year:2008).

Lee, "AUCNET: Electronic Intermediary for Used-Car Transactions," Electronic Market—The International Journal, Dec. 1997, pp. 24-28, vol. 7, No. 4.

T.Y. Lee, S. Li and R. Wei, "Needs-Centric Searching and Ranking Based on Customer Reviews," 2008 10th IEEE Conference on E-Commerce Technology and the Fifth IEEE Conference on Enterprise Computing, E-Commerce and E-Services, Washington, DC, 2008, pp. 128-135. (Year: 2008).

Levy, Michael, and Dhruv Grewal. "Supply chain management in a networked economy." Journal Retailing 76.4 (2000): 415-429.

LIVE365 press release, "Live365 to Offer Opt-In Advertising on Its Website," Oct. 15, 2004.

London Business School, "Overture and Google: Internet Pay-Per-Click (PPC) Advertising Options," Mar. 2003.

M2 Presswire, "Palm, Inc.: Palm unveils new web browser optimised for handhelds; HTML browser offers high-speed web-browsing option," Mar. 13, 2002.

Malone et al., "Electronic Markets and Electronic Hierarchies," Communications of the ACM, Jun. 1987, pp. 484-497, vol. 30, No. 6.

Mansell et al., "Electronic Trading Networks: The Route to Competitive Advantage?" Electronic Markets—The International Journal, Oct. 1993, 1 page, vol. 3, No. 3.

Mardesich, "Onsale takes auction gavel electronic," Computer Reseller News, Jul. 8, 1996, pp. 2, 32.

Marteau, "Shop with One Click, Anywhere, Anytime," Information Management and Consulting, 2000, pp. 44-46, vol. 15, No. 4.

Massimb et al., "Electronic Trading, Market Structure and Liquidity," Financial Analysts Journal, Jan.-Feb. 1994, pp. 39-49.

McGinnity, "Build Your Weapon," PC Magazine, Apr. 24, 2011, printed from www.pcmag.com/print_article2?0,1217, a%253D3955,00.asp.

Meade, "Visual 360: a performance appraisal system that's 'fun," HR Magazine, 44, 7, 118(3), Jul. 1999.

"Mediappraise: Mediappraise Receives National Award for Web-Based Technology That Enables Companies to Solve Thorny HR Problem," Dec. 14, 1998.

Medvinsky et al., "Electronic Currency for the Internet," Electronic Markets—The International Journal, Oct. 1993, 2 pages, vol. 3, No. 3.

metails.com, www.metails.com homepage, printed Oct. 13, 2004.

Microsoft Computer Dictionary, Fifth Edition, front matter and p. 33.

Microsoft Computer Dictionary, Fifth Edition, front matter, back matter, and pp. 479, 486.

Neches, "Fast—A Research Project in Electronic Commerce," Electronic Markets—The International Journal, Oct. 1993, 4 pages, vol. 3., No. 3.

Neisser, "Which is better for Social Media Monitoring: TweetDeck or SproutSocial" Mar. 17, 2011, Social Media Examiner, https://www.socialmediaexaminer.com/which-is-better-for-social-media-monitoring-tweetdeck-or-sproutsocial/.

NEO, "The implementation of an electronic market for pig trading in Singapore," Journal of Strategic Information Systems, Dec. 1992, pp. 278-288, vol. 1, No. 5.

O'Mahony, "An X.500-based Product Catalogue," Electronic Markets— The International Journal, Oct. 1993, 2 pages, vol. 3, No. 3.

"Onsale: Onsale Brings Thrill of Auctions and Bargain Hunting Online: Unique Internet retail services debuts with week-long

(56) References Cited

OTHER PUBLICATIONS charity auction for The Computer Museum in Boston," May 24, 1995, printed from www.dialogweb.com/cgi/dwclient?dwcommand, DWEBPRINT%20810-489267.
"ONSALE joins fray as online shopping pcks up speed: Internet Booms," Comptuer Reseller News, Jun. 5, 1995.
Palm, Inc., PalmTM Web Pro Handbook, copyright 2002-2003.
Post et al., "Application of Auctions as a Pricing Mechanism for the Interchange of Electric Power," IEEE Transactions of Power Systems, Aug. 1995, pp. 1580-1584, vol. 10, No. 3.
Preist et al., "Adaptive agents in a persistent shout double auction," International Conference on Information and Computation, Proceedings of the first international conference on information and computation economies, Oct. 25-28, 1998, Charleston, United States, pp. 11-18.
Qualcomm, "Brew Developer Support," printed from web.archive.org/web/20020209194207/http://www.qualcomm.com/brew/developer/support/kb/52.html on Aug. 30, 2007.
RCR Wireless News, "Lockheed Martin to use 2Roam's technology for wireless platform," RCR Wireless News, Sep. 10, 2001.
Reck, "Formally Specifying an Automated Trade Execution System," J. Systems Software, 1993, pp. 245-252, vol. 21.
Reck, "Trading-Process Characteristics of Electronic Auctions," Electronic Markets—The International Journal, Dec. 1997, pp. 17-23, vol. 7, No. 4.
repcheck.com, www.repcheck.com homepage, printed from web.archive.org/web/20020330183132/http://repcheck.com on Sep. 5, 2009.
Resnick et al., "Reputation Systems," Communications of the ACM, Dec. 2000, pp. 45-48, vol. 43, No. 12.
Rockoff et al., "Design of an Internet-based system for remote Dutch auctions," Internet Research: Electronic Networking Applications and Policy, 1995, pp. 10-16, vol. 5, No. 4.
Rodriguez, Camille, HootSuite vs. social Oomph vs. Tweekdeck, Jan. 4, 2012, http://polkadotimpressions.com/2012/01/04/hootsuite-vs-social-oopmphvs.tweetdeck/ (Year: 2012).
Rose, "Vendors strive to undo Adobe lock-hold," Computer Reseller News, Feb. 5, 1996, n 669, p. 71(7).
Ross, David Frederick, Frederick S. Weston, and W. Stephen. Introduction to supply chain management technologies. CRC Press, 2010.
Rysavy, "Mobile-commerce ASPs do the legwork," Network Computing, Jan. 22, 2001, p. 71, 6 pgs., vol. 12, No. 2.
Saunders, "AdFlight to Offer WAP Ads," Oct. 17, 2000, printed from clickz.com/487531/print.
Schaffer, Neil, The Top 20 Twitter clients—HootSuite, TweetDeck and More, Jan. 31, 2012, https://maximizesocialbusinss.com/top-20-twitter-clients-2012-9175/ (Year: 2012).
Schmid, "Electronic Markets," Electronic Markets—The International Journal, Oct. 1993, 2 pages, vol. 3, No. 3.
Schwankert, "Matsushita Taps 2Roam for Wireless Solutions," www.internetnews.com/bus-news.article.php/674811, Feb. 2, 2001.
Sen, "Inventory and Pricing Models for Perishable Products," Doctor of Philosophy Dissertation—University of Southern California, Aug. 2000.
Siegmann, "Nowhere to go but up," PC Week, Oct. 23, 1995, 3 pages, vol. 12, No. 42.
Telephony Staff, "Air-ASP," Telephony Online, Oct. 2, 2000, 3 pages.
2roam, Inc., multiple archived pages of www.2roam.com retrieved via Internet Archive Wayback Machine on Jun. 10, 2008.
Alt et al., "Bibliography on Electronic Commerce," Electronic Markets—The International Journal, Oct. 1993, 5 pages, vol. 3, No. 3.
Alt et al., "Computer Integrated Logistics," Electronic Markets—The International Journal, Oct. 1993, 1 page, vol. 1, No. 3.
Anonymous, Image manipulation (image-editing software and image-manipulation systems)(Seybold Special Report, Part II), Seybold Report on Publishing Systems, May 15, 1995, pS35(9), vol. 24, No. 18.
auctionwatch.com, multiple pages—including search results for "expedition," printed Apr. 21, 2011.
auctiva.com, multiple pages, undated but website copyright date is "1999-2000.".
Ball et al., "Supply chain infrastructures: system integration and information sharing," ACM SIGMOD Record, 2002, vol. 31, No. 1, pp. 61-66.
Berger et al., "Random Multiple-Access Communication and Group Testing," IEEE, 1984.
Braganza, "Is Resarch at Cranfield—A Look at the Future," Electronic Markets—The International Journal, Oct. 1993, 1 page, vol. 3, No. 3.
Brecht et al., "The IM 2000 Research Programme," Electronic Markets—The International Journal, Oct. 1993, 1 page, vol. 3, No. 3.
Business Wire business/technology editors, "Sellers Flock to OutletZoo.com as New Automatic Price Drop Method Moves Excess Inventory Online," Business Wire, Oct. 25, 1999.
Business Wire business editors/high-tech writers, "PictureWorks Technology, Inc. Expands in Real Estate Market with Adoption of Rimfire on realtor.com," Business Wire, Nov. 8, 1999.
Business Wire business editors/high-tech writers, "PictureWorks Technology, Inc. Shows Strong Revenue Growth in Internet Imaging Business," Business Wire, Nov. 10, 1999.
Business Wire business editors/high-tech writers, "2Roam Partners with Pumatech to Delivery Wireless Alerts," Business Wire, Dec. 18, 2000.
Business Wire business editors/high-tech writers, "2Roam Takes eHow's How-to Solutions Wireless: With 2Roam, the Web's One-Stop Source for getting Things Done is on More Wireless Devices, with Ability to Purchase Its Products from Anywhere," Business Wire, Oct. 2, 2000.
Business Wire business editors/high-tech writers, "2Roam Drives Hertz to the Wireless Web: Number One Car Rental Company to Provide Customers Wireless Access from Any Device," Business Wire, Aug. 7, 2001.
buy.com, www.buy.com homepage, printed Oct. 13, 2004.
Chen et al., "Detecting Web Page Structure for Adaptive Viewing on Small Form Factor Devices," ACM, May 20-24, 2003.
Chen, M. (2007). Knowledge assisted data management and retrieval in multimedia database systems (Order No. 3268643).
Y.K. Choi and S. K. Kim, "An auxillary reccomendation system for repetitively purchasing items in E-commerce," 2014 International Conference on Big Data and Smart Computing (BIGCOMP), Bangkok, 2014, pp. 96-98. (Year 2014).
Clarke, "Research Programme in Supra-organizational Systems," Electronic Markets—The International Journal, Oct. 1993, 2 pages, vol. 3, No. 3.
Clemons et al., "Evaluating the prospects for alternative electronic securities markets," Proceedings of the twelfth International conference on information systems, New York, New York, United States, pp. 53-64, 1991.
Fan, J., Keim, F.A., Gao, Y., Luo, H. and Li, Z. (2009). JustClick: Personalized Image Recommendation via Exploratory Search from Large-Scale Flickr Images. Feb. 2009. IEEE Transactions on Circuits and Systems for Video Technology, 19(2), pp. 2730288. (Year: 2009).
friendster.com, homepage and "more info" pages, printed Apr. 29, 2004.
Google News archive search for "2Roam marketing" performed over the date range 2000-2003.
Google News archive search for "2Roam SMS" performed over the date range 2000-2008.
Grabowski et al., "Mobile-enabled grid middleware and/or grid gateways," GridLab—A Grid Application Toolkit and Testbed, Work Package 12—Access for Mobile Users, Jun. 3, 2003.
Graham, "The Emergence of Linked Fish Markets in Europe," Electronic Markets—The International Journal, Jul. 1993, 4 pages, vol. 8, No. 2.
Gunthorpe et al., "Portfolio Composition and the Investment Horizon," Financial Analysts Journal, Jan.-Feb. 1994, pp. 51.

(56) References Cited

OTHER PUBLICATIONS

Halperin, "Toward a Process Handbook for Organizational Coordination Processes," Electronic Markets—The International Journal, Oct. 1993, 1 page, vol. 3, No. 3.
Hess et al., "Computerized Loan Origination Systems: An Industry Case Study of the Electronic Markets Hypothesis," MIS Quarterly, Sep. 1994, pp. 251-275.
IBM, "Anyonymous Delivery of Goods in Electronic Commerce," IBM Technical Disclosure Bulletin, Mar. 1996, pp. 363-366, vol. 39, No. 3.
IBM, "Personal Optimized Decision/Transaction Program," IBM Technical Disclosure Bulletin, Jan. 1995, pp. 83-84, vol. 38, No. 1.
ICROSSING, "ICROSSING Search Synergy: Natural & Paid Search Symbiosis," Mar. 2007.
IEEE 100—The Authoritative Dictionary of IEEE Standard Terms, Seventh Edition, 2000. Entire book cited; table of contents, source list, and terms beginning with A included. ISBN 0-7381-2601-2a.
Ives et al., "Editor's Comments—MISQ Central: Creating a New Intellectual Infrastructure," MIS Quarterly, Sep. 1994, p. xxxv.
Joshi, "Information visibility and its effect on supply chain dynamics," Ph.D. dissertation, Massachusetts Institute of Technology, 2000 (fig. 4.5; p. 45).
Klein, "Information Logistics," Electronic Markets—The International Journal, Oct. 1993, pp. 11-12, vol. 3, No. 3.
Klein, "Introduction to Electronic Auctions," Electronic Markets—The International Journal, Dec. 1997, 4 pages, vol. 7, No. 4.
Kubicek, "The Organization Gap," Electronic Markets—The International Journal, Oct. 1993, 1 page, vol. 3, No. 3.
S. Kulkarni, A. M. Sankpal, R.R. Mudholkar and Kirankumari, "Recommendation engine: Matching individual/group profiles for better shopping experience," 2013 15th International Conference on Advanced Computing Technologies (ICACT), Rajampet, 2013, pp. 1-6. (Year: 2013).
Kuula, "Telematic Services in Finland," Electronic Markets—The International Journal, Oct. 1993, 1 page, vol. 3, No. 3.
Lalonde, "The EDI World Institute: An International Approach," Electronic Markets—The International Journal, Oct. 1993, 1 page, vol. 3, No. 3.
Lee et al., "Intelligent Electronic Trading for Commodity Exchanges," Electronic Markets—The International Journal, Oct. 1993, 2 pages, vol. 3, No. 3.
Lee et al., "Electronic Brokerage and Electronic Auction: The Impact of IT on Market Structures," Proceedings of the 29th Annual Hawaii International Conference on System Sciences, 1996, pp. 397-406.
Anon., "ID.me to Host SXSW Panel How Digital Identity is Enabling Access to the VA on Mar. 12," ICT Monitor Worldwide [Amman] Mar. 3, 2017. (Year: 2017).
Wikipedia Database Server, archived Apr. 14, 2016, one page, retrieved from https://web.archive.org/web/20160414095218/https://en.wikipedia.org/wiki/Database_server (Year: 2016).

\* cited by examiner

SYSTEM AND METHOD OF MAPPING PRODUCT ATTRIBUTES BETWEEN DIFFERENT SCHEMAS

CROSS-REFERENCE TO RELATED APPLICATIONS

This application is a continuation of U.S. patent application Ser. No. 17/074,777, filed Oct. 20, 2020, now U.S. Pat. No. 11,631,124, issued Apr. 18, 2023, which is a continuation of U.S. patent application Ser. No. 14/861,806, filed on Sep. 22, 2015, now U.S. Pat. No. 10,810,654, issued Oct. 20, 2020, which is a continuation-in-part of U.S. patent application Ser. No. 14/271,113 filed on May 6, 2014, which claims the benefit of U.S. Provisional Application No. 61/820,064, filed May 6, 2013, all of which are hereby incorporated by reference herein in their entireties, including but not limited to those portions that specifically appear hereinafter, the incorporation by reference being made with the following exception: In the event that any portion of the above-referenced applications are inconsistent with this application, this application supercedes the above-referenced applications.

STATEMENT REGARDING FEDERALLY SPONSORED RESEARCH OR DEVELOPMENT

Not Applicable.

BACKGROUND

1. The Field of the Present Disclosure

The present disclosure relates generally to electronic commerce ("e-commerce").

2. Description of Related Art

Business conducted over the Internet, referred to as e-commerce, has grown dramatically with the proliferation of consumer electronic devices. For example, online enterprises conduct e-commerce with users through e-commerce websites made available on a network, such as the Internet.

To assist users in locating desired products, e-commerce websites often organize products using taxonomies. Taxonomies are ordered classifications of information, which may be used for organizing information in a way that makes it more accessible for retrieval. The typical form of a taxonomy is hierarchical. For example, at the top levels of a hierarchy, general terms are used to describe the information. Beneath the top levels, more descriptive terms that refine the top-level terms are used. As such, a hierarchical taxonomy may be represented as a tree of information nodes, in which each node inherits all of its predecessors' attributes, and descriptive terms and other forms of metadata may be used to identify the nodes. On an e-commerce website, users navigate through the product taxonomy by clicking on the appropriate links that represent a hierarchical taxonomy.

Products may be categorized in a taxonomy according to their product attributes pursuant to an automated process. Alternatively, merchants may manually select one or more categories of the taxonomy for a product listing.

Increasingly, e-commerce website operators allow third parties, often referred to as "partners" or "product sellers," to list products on their websites. Often times, the third party sellers desire to list their products on multiple e-commerce websites.

One difficulty facing product sellers that list products on multiple e-commerce websites is that each e-commerce website may have its own unique taxonomy and product attribute fields, sometimes referred to herein as a "schema." That is, for each e-commerce website, sellers typically manually enter product attributes and product taxonomy information because this information is not easily transferable between different e-commerce websites due to the unique schema, i.e., taxonomy and product attribute fields, of each of the websites.

It would be an improvement of the art to provide an automated process that allows product sellers to list products on different e-commerce websites having unique schemas without having to manually enter information. It would be a further improvement to provide a system and method for automatic mapping between difference schemas.

The features and advantages of the present disclosure will be set forth in the description that follows, will be apparent from the description, or may be learned by the practice of the present disclosure without undue experimentation. The features and advantages of the present disclosure may be realized and obtained by means of the instruments and combinations particularly pointed out in the appended claims.

BRIEF DESCRIPTION OF THE DRAWINGS

The features and advantages of the disclosure will become apparent from a consideration of the subsequent detailed description presented in connection with the accompanying drawings in which.

DETAILED DESCRIPTION

Figure 1:
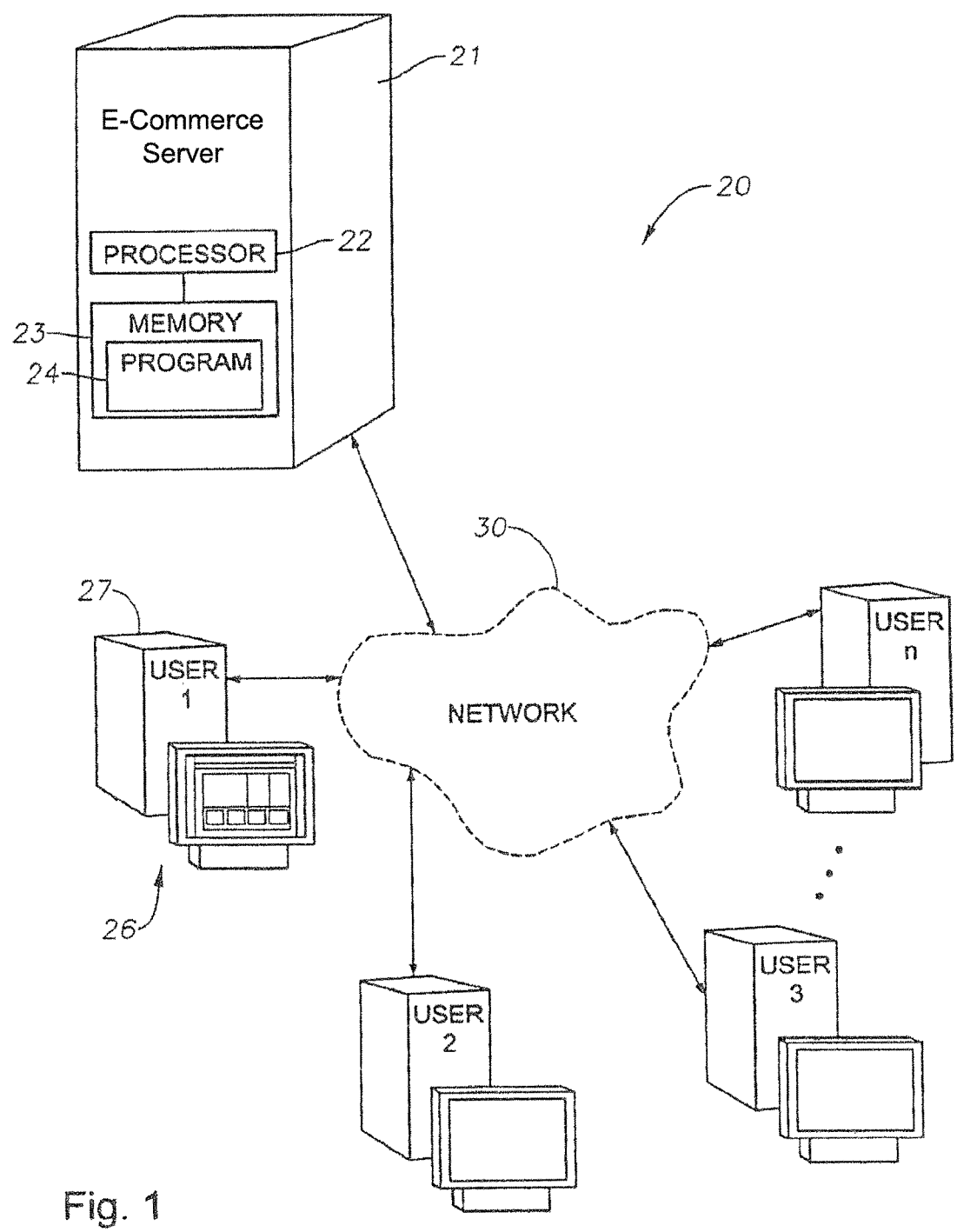
FIG. 1 is a block diagram of a system according to an illustrative embodiment of the present disclosure.

For the purposes of promoting an understanding of the principles in accordance with the disclosure, reference will now be made to the embodiments illustrated in the drawings, and specific language will be used to describe them. It will nevertheless be understood that no limitation of the scope of the disclosure is thereby intended. Any alterations and further modifications of the inventive features illustrated herein, and any additional applications of the principles of the disclosure as illustrated herein, which would normally occur to one skilled in the relevant art and having possession of this disclosure, are to be considered within the scope of the disclosure claimed.

In describing and claiming the present disclosure, the following terminology will be used in accordance with the definitions set out below. As used in this specification and the appended claims, the singular forms "a," "an," and "the" include plural referents unless the context clearly dictates otherwise. As used in this specification and the appended claims, the terms "comprising," "including," "containing,"

"having," "characterized by," and grammatical equivalents thereof are inclusive or open-ended terms that do not exclude additional, unrecited elements or method steps.

Referring now to FIG. 1, there is depicted a system 20 suitable for conducting e-commerce over a network, such as the Internet. According to examples of embodiments of the present invention, the system 20 can be positioned to provide products for sale on an online retailer/wholesaler website, sometimes referred to as an e-commerce website. The system 20 can include an online retailer or wholesale services in the form of an e-commerce server 21. One or more user computers 27 are positioned remotely from and in communication with the e-commerce server 21 through an electronic communication network 30, such as the Internet or other internetwork.

The system 20 can also include an e-commerce computer program 24 stored on a tangible computer medium, such as, for example, one or more various types of memory, such as, for example, memory 23 of the server 21. The program 24 may contain instructions, that when executed by the processor 22, cause the processor 22 to provide an e-commerce website to users on the remote computers 27. The system 20 can also include a plurality of database servers (not shown) that warehouse data regarding e-commerce conducted through the system 20.

As understood by those skilled in the art, the memory 23 of the server 21 can include volatile and nonvolatile memory known to those skilled in the art including, for example, RAM, ROM, and magnetic or optical disks, just to name a few. It should also be understood by those skilled in the art that although illustrated as a single server, the illustrated configuration of the server 21 is given by way of example and that other types of servers or computers configured according to various other methodologies known to those skilled in the art can be used.

The server 21 shown schematically in, for example, FIG. 1 may represent an e-commerce enterprise comprising a server or server cluster or server farm and is not limited to any individual physical server. The server site may be deployed as a server farm or server cluster managed by a server-hosting provider. The number of servers and their architecture and configuration may be increased based on usage, demand, and capacity requirements for the system 20.

Similarly, database servers (not shown) may connected to the server 21, each database server representing a server or server cluster or server farm and are not limited to any individual physical server or configuration. As also understood by those skilled in the art, user computers 27 in these embodiments can be a laptop, desktop, personal digital assistants or PDAs, cell phones, servers, computers, or other types of computers. As known and understood by those skilled in the art, the network 30 can include the Internet or world wide web of a plurality of computers/servers in communication with one or more other computers through a communication network, and/or portions of a local or other area network.

As further understood by those skilled in the art, the program 24 can be in the form of microcode, programs, routines, and symbolic languages that provide a specific set for sets of ordered operations that control the functioning of the hardware and direct its operation, as known and understood by those skilled in the art. The program 24, according to an embodiment of the present invention, also need not reside in its entirety in volatile memory, but can be selectively loaded, as necessary, according to various methodologies as known and understood by those skilled in the art. As further understood by those skilled in the art, the term "computer-readable medium" encompasses distribution media, intermediate storage media, execution memory of a computer, and any other medium or device capable of storing the program 24 implementing the functionality or processes of various embodiments of the present invention for later reading by a computer. The program 24 can be copied from the computer-readable medium to a hard disk or a similar intermediate storage medium.

When the program 24, or portions thereof, is to be run, it can be loaded either from its distribution medium or its intermediate storage medium into the execution memory of the computer, configuring the computer to act in accordance with the functionality or method of various embodiments this invention. All such operations are well known to those skilled in the art of computer systems.

According to an exemplary embodiment of the present invention, the program 24 can include a set of instructions that when executed by the processor 22, causes the server 21, to perform the operations of: providing an e-commerce website, including product information regarding products for sale. The product information may be displayed to users on the remote computers 27 on webpages, as viewed, for example, on a display 26 of one or more remote user computers 27, through the communication network 30, e.g., Internet.

To assist users in finding products listed for sale by the e-commerce server 21, product listings on the e-commerce server 21 may be organized pursuant to a unique schema, which includes product attributes and taxonomy information. The product attributes may be utilized to respond to search results conducted by users. Product attributes may be utilized to categorize products in the unique taxonomy. Alternatively, the products may be manually categorized in the taxonomy. Further, products may be categorized in search results based on their product attributes.

It will be appreciated by those having ordinary skill that the product attributes may include any information associated with the products, including, without limitation, general product descriptions, product type, brand, style, fashion, specific product descriptions, variants, condition, pricing and availability, unique product identifiers, gender, age group, color, size, material, pattern, title, etc.

Figure 2:
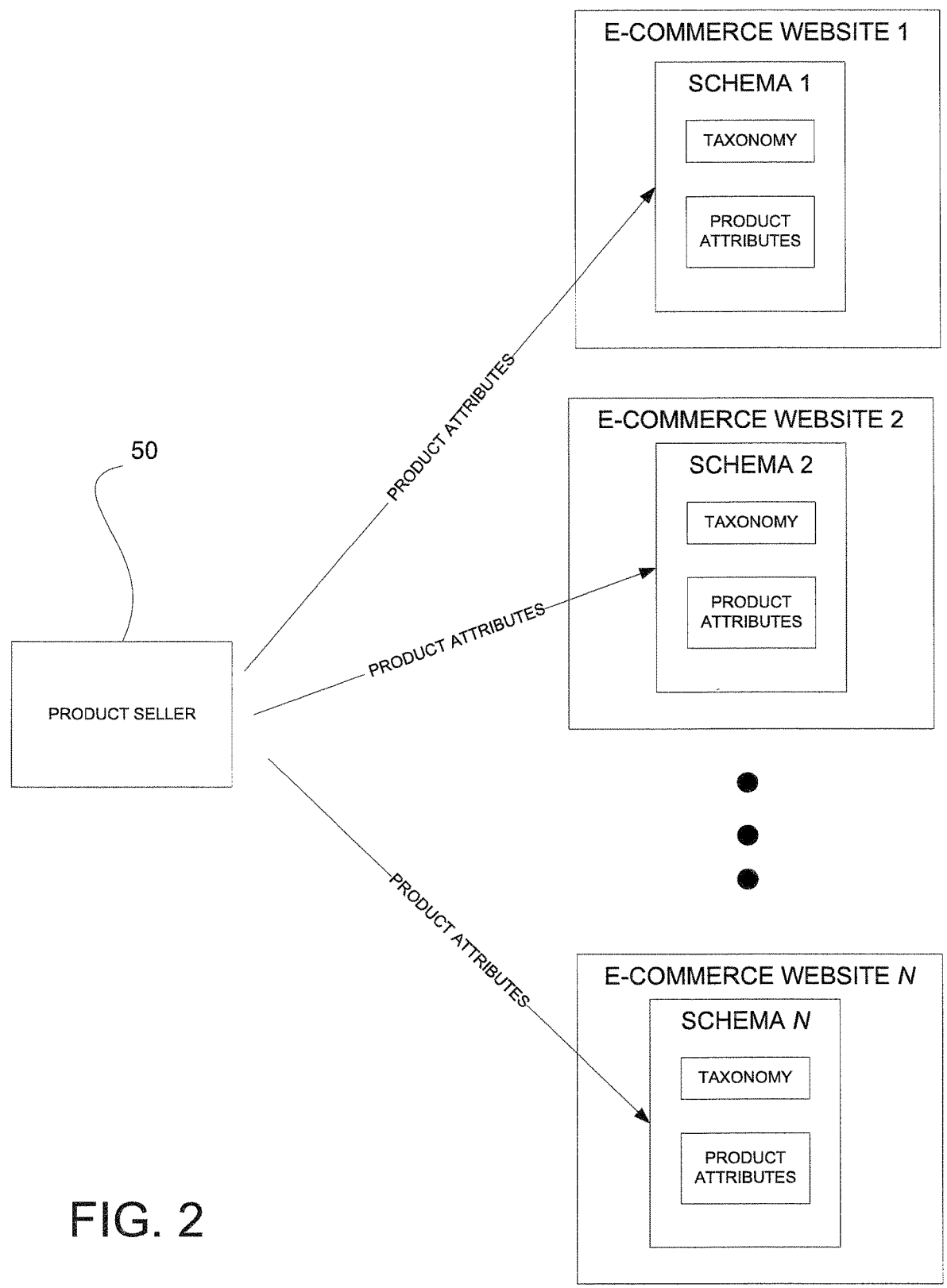
FIG. 2 is a block diagram of a system according to an illustrative embodiment of the present disclosure.

Referring now to FIG. 2, a product seller 50 may desire to provide product listings on multiple e-commerce websites, shown as e-commerce websites 1 through N. Each e-commerce website may have its own schema for organizing product information, shown as schemas 1 through N. Each schema may have its own taxonomy structure and product attribute fields. That is, the taxonomies and product attributes across the e-commerce websites, 1 through N, may be unique. For example, a product categorization in the taxonomy of schema 1 may not be present in the taxonomy of schema 2. Likewise, product attributes dictated by schema 1 may not be present in the product attributes of schema 2. This is true because each schema may be unique to its own website as determined by the website operators.

Figure 3:
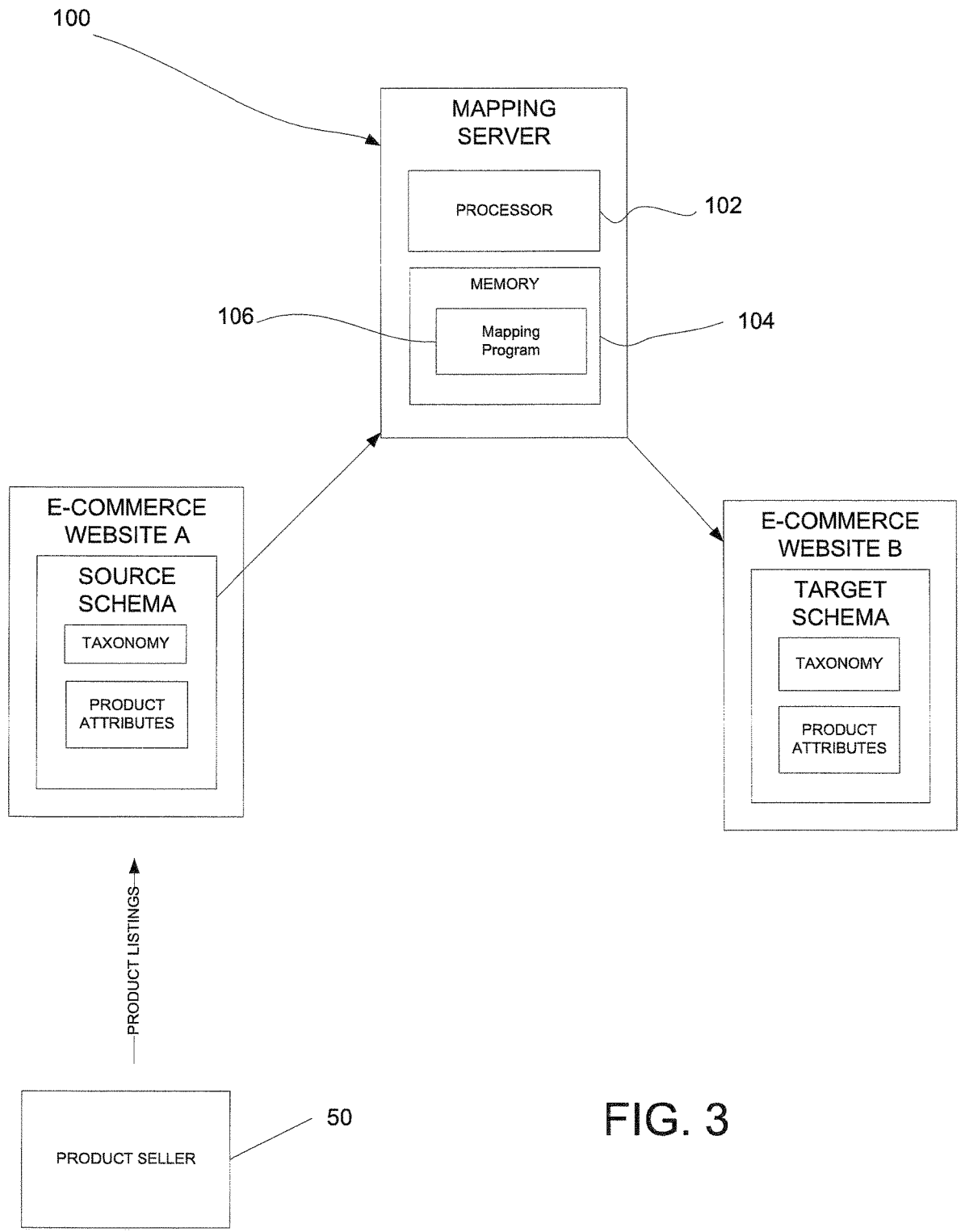
FIG. 3 is a block diagram of a system according to an illustrative embodiment of the present disclosure.

Referring now to FIG. 3, there is depicted a mapping server 100 for automatically mapping taxonomy and product attributes between different schemas used by e-commerce websites. In particular, the product seller 50 may define product listings according to a source schema of an e-commerce website A. That is, the e-commerce website A requires that the product seller 50 provide taxonomy and product attribute information unique to the source schema. In an illustrative embodiment, the taxonomy and product attribute information for the products is entered manually through a computer in accordance with schema 1. In an illustrative embodiment, the taxonomy and product attribute information entered is for at least one product listing. In an illustrative embodiment, the taxonomy and product attribute information are for at least one hundred product listings. The taxonomy and product attribute information for the products entered pursuant to source schema is stored in a product database on an electronic storage medium.

At a future time, the product seller 50 may also desire to provide product listings on the e-commerce website B. In lieu of having the product seller 50 manually re-enter the product information according to a target schema, the mapping server 100 automatically maps the product information provided under the source schema to the target schema in the manner that will be described below. The taxonomy and product attribute information for the products entered pursuant to the target schema is stored in a product database on an electronic storage medium.

The mapping server 100 includes a processor 102 and a memory 104. The server 100 further includes a mapping program 106 stored on a tangible computer medium, such as, for example, one or more various types of memory, such as, for example, memory 104. The program 106 contains instructions, that when executed by the processor 102, causes the processor 102 to automatically map product taxonomy and attribute information from the source schema to the target schema. The server 100 can also include a plurality of database servers (not shown) that warehouse data regarding e-commerce conducted through the server 100. The server 100 may include a database of master attributes for the product listings as will be described in more detail herein after.

As understood by those skilled in the art, the memory 104 of the server 100 can include volatile and nonvolatile memory known to those skilled in the art including, for example, RAM, ROM, and magnetic or optical disks, just to name a few. It should also be understood by those skilled in the art that although illustrated as a single server, the illustrated configuration of the server 100 is given by way of example and that other types of servers or computers configured according to various other methodologies known to those skilled in the art can be used.

The server 100 shown schematically in, for example, FIG. 3 may represent a server or server cluster or server farm and is not limited to any individual physical server. The server site may be deployed as a server farm or server cluster managed by a server-hosting provider. The number of servers and their architecture and configuration may be increased based on usage, demand and capacity requirements for the system.

Similarly, database servers (not shown) may connected to the server 100, each database server representing a server or server cluster or server farm and are not limited to any individual physical server or configuration.

As further understood by those skilled in the art, the program 106 can be in the form of microcode, programs, routines, and symbolic languages that provide a specific set or sets of ordered operations that control the functioning of the hardware and direct its operation, as known and understood by those skilled in the art. The program 106, according to an embodiment of the present invention, also need not reside in its entirety in volatile memory, but can be selectively loaded, as necessary, according to various methodologies as known and understood by those skilled in the art. As further understood by those skilled in the art, the term "computer-readable medium" encompasses distribution media, intermediate storage media, execution memory of a computer, and any other medium or device capable of storing the program 106 implementing the functionality or processes of various embodiments of the present invention for later reading by a computer. The program 106 can be copied from the computer-readable medium to a hard disk or a similar intermediate storage medium.

When the program 106, or portions thereof, is to be run, it can be loaded either from its distribution medium or its intermediate storage medium into the execution memory of the server 100, configuring the server 100 to act in accordance with the functionality or method of various embodiments of this invention. All such operations are well known to those skilled in the art of computer systems.

According to an exemplary embodiment of the present invention, the program 106 can include a set of instructions that when executed by the processor 102, causes the server 100, to perform the operations of mapping the product taxonomy and attribute information organized pursuant to a source schema to the organization of a target schema. It will be appreciated that the program 106 eliminates the need for the product seller 50 to manually enter the information pursuant to the target schema. It will be further appreciated that a product's categorization pursuant to a given taxonomy may be considered a product attribute for purposes of this disclosure. It will be further appreciated, that the information exchanged between the mapping server 100 and the e-commerce websites A and B may be transmitted over a network, such as the Internet.

Figure 4:
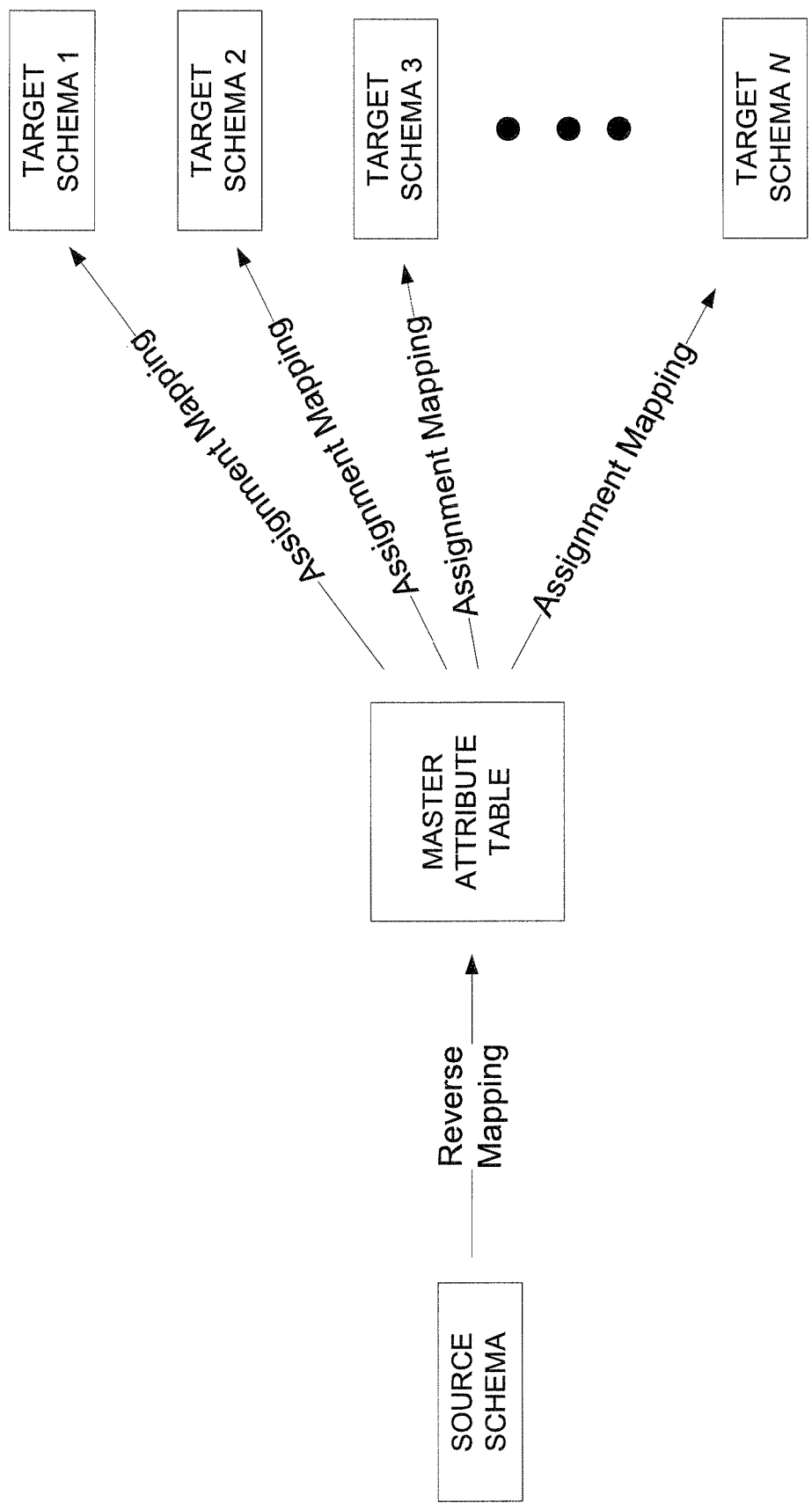
FIG. 4 is a block diagram of a system according to an illustrative embodiment of the present disclosure.

Referring now to FIGS. 3 and 4, there are depicted flow diagrams of a general overview of the algorithm of the mapping program 106 for mapping between different schemas. As shown, the program 106 causes the processor 102 to first reverse map at least one of the product attributes and taxonomy information defined in the source schema to populate a master attribute table. The master attribute table may be stored in a database.

The reverse map may be unique to the source schema. The reverse map may be stored in a database. Using the master attribute table, the program 106 then causes the processor 102 to map the entries in the master attribute table to the target schema. The mapping from the master attribute table to target schema may be unique. It will be appreciated that once created, that the master attributes may be utilized to map to multiple schemas. But, it will be appreciated that each mapping to a target schema is unique.

Figure 5:
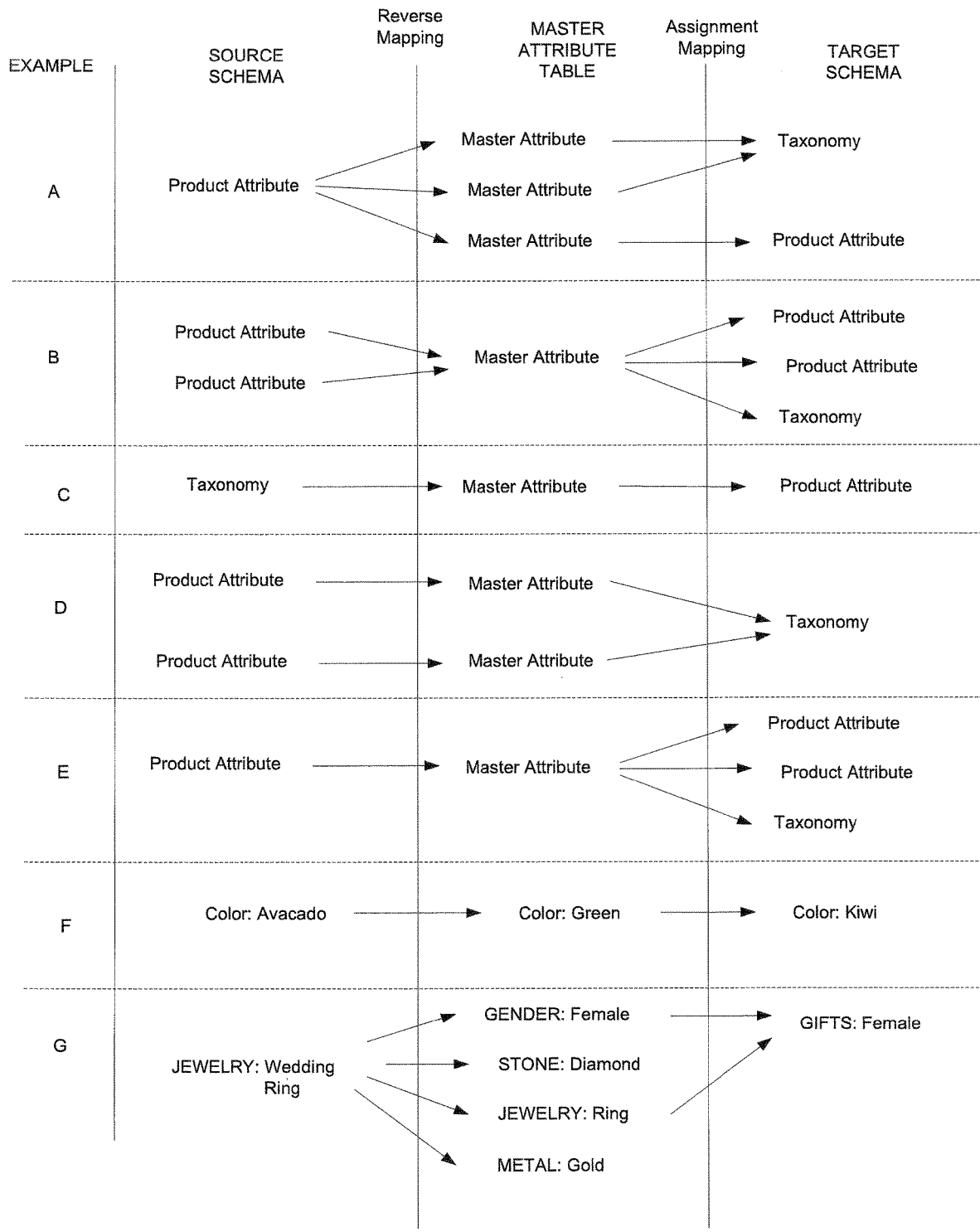
FIG. 5 is a diagram of a mapping system according to an illustrative embodiment of the present disclosure.

Referring now to FIG. 5, there are shown multiple examples, Examples A-G, of mappings from a source schema to a target schema by the server 100 using a reverse mapping and an assignment mapping. Each of these examples will be explained below.

Example A

This example demonstrates that a single product attribute in the source schema may be reverse mapped to multiple master attributes in the master attribute table. This example further demonstrates that multiple master attributes may be mapped to a taxonomy categorization in the target schema. This example further demonstrates that a single master attribute may be mapped to a product attribute in the target schema.

Example B

This example demonstrates that multiple product attributes in the source schema may be reversed mapped to determine a single master attribute. This example further demonstrates that a single master attribute may be mapped to determine multiple product attributes and a taxonomy categorization in the target schema.

Example C

This example demonstrates that a taxonomy categorization in the source schema may be reverse mapped to a master attribute. This example further demonstrates that a master attribute may be mapped to a product attribute in the target schema.

Example D

This example demonstrates that multiple master attributes may be mapped to a single taxonomy categorization in the target schema.

Example E

This example demonstrates that a product attribute in the source schema may be reverse mapped to a master attribute that is then mapped to multiple product attributes in the target schema as well as a taxonomy categorization.

Example F

This specific example demonstrates that a product attribute in the source schema may be reversed mapped to a master attribute in the master attributes table, and a different product attribute in the target schema.

Example G

This example demonstrates a specific example of how a taxonomy categorization in the source schema is mapped to a taxonomy categorization in the target schema. In this example, the target schema may not have a category for wedding rings in its taxonomy, but may have a taxonomy categorization for female gifts.

From the above examples, it will be appreciated that there is not necessarily a one-to-one correspondence between the source schema, master attributes, and the target schema. As used herein, the term "schema" may refer to the underlying organizational structure of the taxonomy and product attributes for organization of product information on an e-commerce website. It will be appreciated that the taxonomy categorization and the product attributes in the source and target schemas may be stored as name/value pairs in a database. It will be further appreciated that the master attributes may be stored as name/value pairs in a database.

Figure 6:
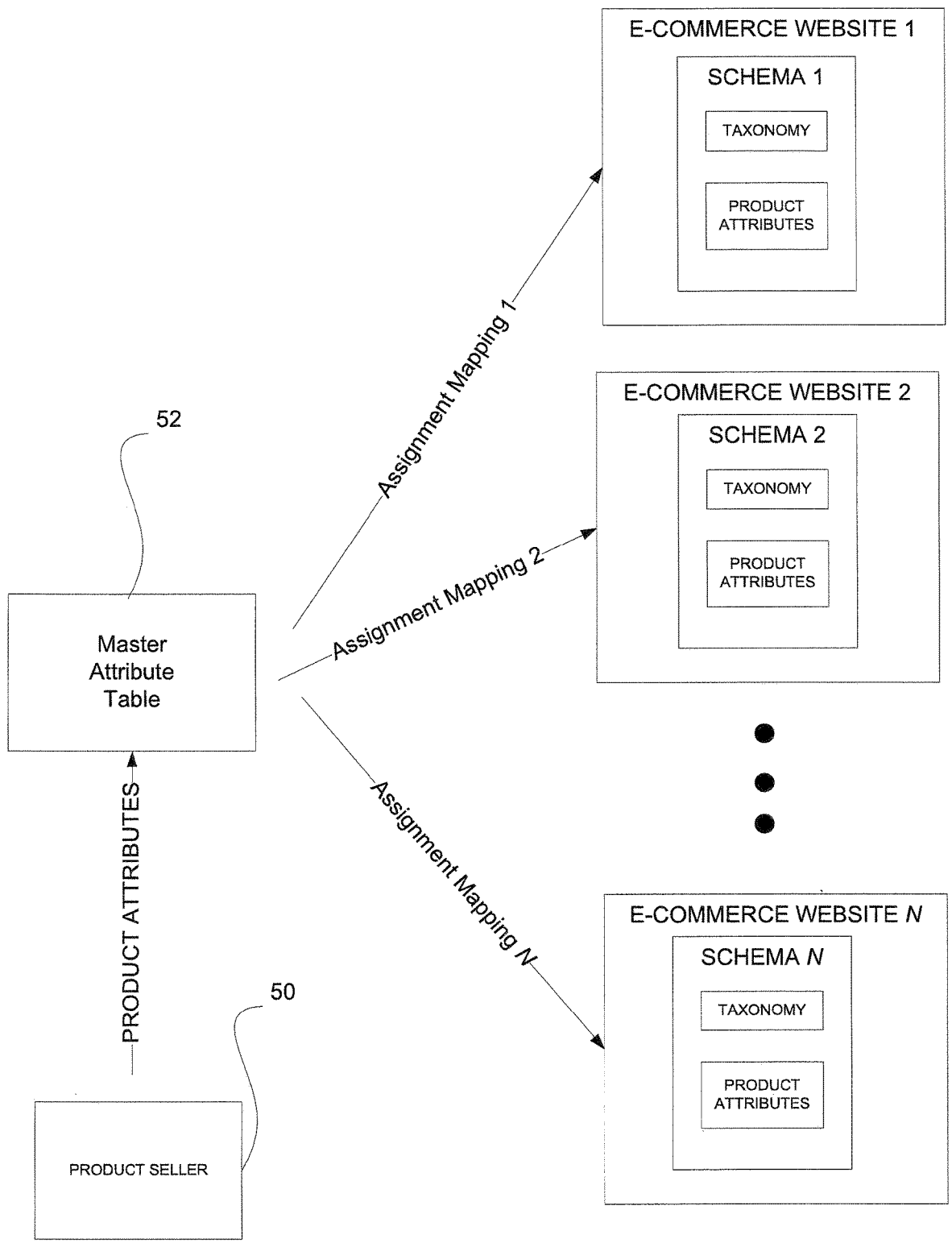
FIG. 6 is a block diagram of a system according to an illustrative embodiment of the present disclosure.

Referring now to FIG. 6, in an illustrative embodiment, the product seller 50 may directly enter product attributes into the master attribute table 52 such that no reverse mapping is required. The master attributes in the master attribute table may then be mapped to the schemas of different e-commerce websites, e-commerce websites 1-N, using unique assignment mappings 1-N.

Figure 7:
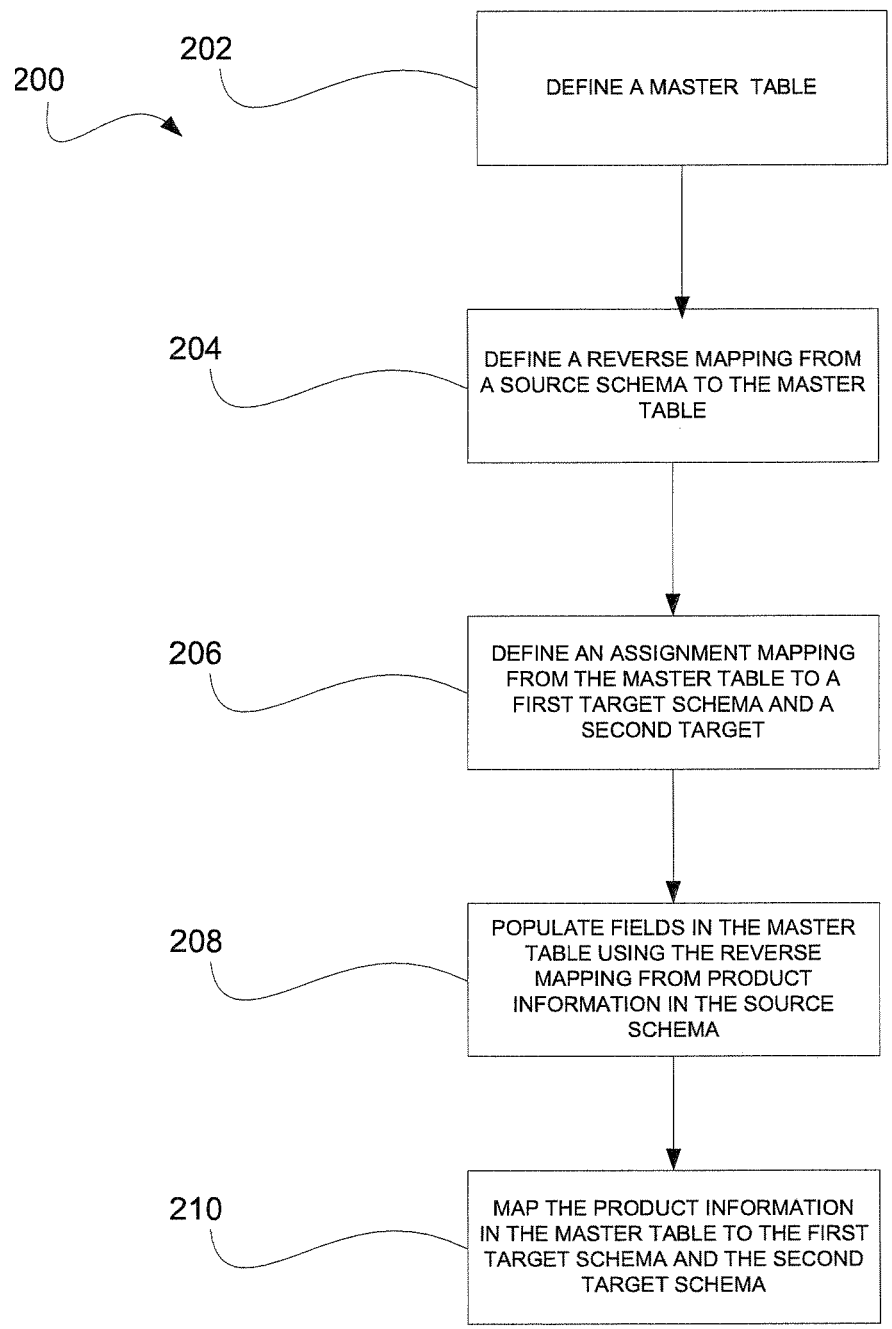
FIG. 7 is a flow chart according to an illustrative embodiment of the present disclosure.

Referring now to FIG. 7, there is depicted a flow diagram of a computer-implemented process 200 for mapping at least one of product attributes and taxonomy information from a source schema to a target schema according to an illustrative embodiment of the present disclosure. The process 200 may be performed by the processor 102 of the mapping server 100 shown in FIG. 3. That is, the process 200 may be embodied in the mapping program 106 that is executed by the processor 102. At step 202, a master table is defined as an organizational structure in a computer database. The master table may include a column of master attributes and master taxonomies. Associated with each of the master attributes and master taxonomies are fields for data entry. At step 204, a computer-assisted reverse mapping from a source schema to the master table is defined. At step 206, a first assignment mapping from the master table to a first target schema and a second assignment mapping to a second target schema are defined. At step 208, at least one of product attributes and taxonomy information defined in the source schema is reverse mapped using the reverse mapping to populate fields in the master table. At step 210, the product information in the fields of the master table is mapped to the first target schema using the first assignment mapping and, optionally, the product information in the fields of the master table is mapped to the second target schema using the second assignment mapping. It will be appreciated that additional assignment mappings may be defined to map the information in the master table to additional target schemas.

In an illustrative embodiment, the present disclosure provides an e-commerce system comprising: a processor; a memory coupled to the processor; wherein the computer-readable instructions stored in the memory, when executed by the processor, cause the processor to perform the operations of (i) apply a pre-defined reverse mapping to product attributes defined in the source schema to populate a master attribute table with master attributes, and (ii) apply a first pre-defined assignment mapping to the master attributes in the master attribute table to define product attributes in a first target schema. The present disclosure may further provide an e-commerce system described above, wherein the computer-readable instructions are further operable, when executed by the processor, to cause the processor to perform the operations of applying a second pre-defined assignment mapping to the master attributes in the master attribute table to define product attributes in a second target schema. The present disclosure may further provide an e-commerce system described above, wherein the computer-readable instructions are further operable, when executed by the processor, to cause the processor to perform the operations of applying a third pre-defined assignment mapping to the master attributes in the master attribute table to define product attributes in a third target schema. The present disclosure may further provide an e-commerce system described above, wherein the computer-readable instructions are further operable, when executed by the processor, to cause the processor to perform the operations of applying the pre-defined reverse mapping to product taxonomy information defined in the source schema to populate the master attribute table with master product taxonomy information. The present disclosure may further provide an e-commerce system described above, wherein the computer-readable instructions are further operable, when executed by the processor, to cause the processor to perform the operations of applying the first pre-defined assignment mapping to the product taxonomy information in the master attribute table to define product taxonomy information in the first target schema. The present disclosure may further provide an e-commerce system described above, wherein the computer-readable instructions are further operable, when executed by the processor, to cause the processor to perform the operations of populating a product hierarchy of an e-commerce website with the product attributes defined in the first target schema. The present disclosure may further provide an e-commerce system described above, wherein the product attributes define a product listing for at least one product offered for sale online. The present disclosure may further provide an e-commerce system described above, wherein the product attributes define a product listing for at least one hundred products offered for sale online.

In an illustrative embodiment, the present disclosure provides a method of mapping schema data between a source schema and a target schema, said method comprising: defining, using a mapping server, a reverse mapping for mapping at least one of product attributes and taxonomy information defined in the source schema to entries of a master table; and defining, using the mapping server, a first assignment mapping for mapping entries in the master table to the first target schema. The present disclosure may further provide the method described above, further comprising applying, using the mapping server, the reverse mapping to at least one of product attributes and taxonomy information defined in the source schema to populate entries of the master table. The present disclosure may further provide the method described above, further comprising applying, using the mapping server, the first assignment mapping to the entries of the master attribute table to map the entries to the first target schema. The present disclosure may further provide the method described above, further comprising defining, using the mapping server, a second assignment mapping for mapping entries in the master table to a second target schema. The present disclosure may further provide the method described above, further comprising applying, using the mapping server, the second assignment mapping to the entries of the master table to map the entries to the second target schema. The present disclosure may further provide the method described above, further comprising defining, using the mapping server, a third assignment mapping for mapping entries in the master table to a third target schema. The present disclosure may further provide the method described above, further comprising applying, using the mapping server, the third assignment mapping to the entries of the master table to map the entries to the third target schema. The present disclosure may further provide the method described above, further comprising mapping taxonomy information in the source schema to entries in the master table. The present disclosure may further provide the method described above, further comprising mapping entries in the master table to taxonomy fields in the first target schema. The present disclosure may further provide the method described above, further comprising mapping entries in the master table to product attribute fields in the first target schema. The present disclosure may further provide the method described above, wherein the at least one of the product attributes and taxonomy information define a product listing for at least one product offered for sale online.

In an illustrative embodiment, the present disclosure may further provide a computer-implemented method of mapping product attributes from a source schema to a target schema, said method comprising: defining a master attribute table using a mapping server; defining a reverse mapping from the source schema to a master attribute list using the mapping server; defining an assignment mapping from the master attribute list to the target schema using the mapping server; processing, with the mapping server, product attributes in the source schema to populate master attributes in the master attribute table using the reverse mapping; and processing, with the mapping server, the master attributes in the master attribute table to define product attributes in the target schema.

In the foregoing Detailed Description, various features of the present disclosure are grouped together in a single embodiment for the purpose of streamlining the disclosure. This method of disclosure is not to be interpreted as reflecting an intention that the claimed disclosure requires more features than are expressly recited in each claim. Rather, as the following claims reflect, inventive aspects lie in less than all features of a single foregoing disclosed embodiment. Thus, the following claims are hereby incorporated into this Detailed Description of the Disclosure by this reference, with each claim standing on its own as a separate embodiment of the present disclosure.

It is to be understood that the above-described arrangements are only illustrative of the application of the principles of the present disclosure. Numerous modifications and alternative arrangements may be devised by those skilled in the art without departing from the spirit and scope of the present disclosure and the appended claims are intended to cover such modifications and arrangements. Thus, while the present disclosure has been shown in the drawings and described above with particularity and detail, it will be apparent to those of ordinary skill in the art that numerous modifications, including, but not limited to, variations in size, materials, shape, form, function and manner of operation, assembly and use may be made without departing from the principles and concepts set forth herein.

What is claimed is:

1. An e-commerce system comprising:
   a processor;
   a memory coupled to the processor;
   computer-readable instructions stored in the memory that, when executed by the processor, cause the processor to perform the operations of (i) applying a pre-defined reverse mapping to product attributes defined in a source schema to populate a master attribute table with master attributes, and (ii) applying two or more pre-defined assignment mappings to the master attributes in the master attribute table to define product attributes in two or more target schema;
   wherein each of the two or more pre-defined assignment mappings is applied to multiple products to create listings in each of the two or more target schema;
   wherein each of the two or more pre-defined assignment mappings is associated with a single target schema;
   wherein each of the two or more target schema is configured to be displayed on one or more different e-commerce websites, wherein each of the two or more target schema is associated with a different e-commerce website;
   wherein each of the master attributes in the master attribute table is mapped to one or more product target attributes in each of the two or more target schema.

2. The system of claim 1, wherein the computer-readable instructions are further operable, when executed by the processor, to cause the processor to perform the operations of applying the pre-defined reverse mapping to product taxonomy information defined in the source schema to populate the master attribute table with master product taxonomy information.

3. The system of claim 2, wherein the computer-readable instructions are further operable, when executed by the processor, to cause the processor to perform the operations of applying one of the two or more pre-defined assignment mappings to the product taxonomy information in the master attribute table to define product taxonomy information in one of the two or more target schema.

4. The system of claim 1, wherein the computer-readable instructions are further operable, when executed by the processor, to cause the processor to perform the operations of populating a product hierarchy of an e-commerce website with the product attributes defined in one of the two or more target schema.

5. The system of claim 1, wherein the product attributes define a product listing for at least one product offered for sale online.

6. The system of claim 1, wherein the product attributes define a product listing for at least one hundred products offered for sale online.

7. A method of mapping schema data between a source schema and two or more target schema, said method comprising:
- defining, by executing a mapping program on a mapping server, a reverse mapping for mapping at least one of product attributes and taxonomy information defined in the source schema to entries of a master table;
- defining two or more assignment mappings for mapping entries in the master table to the two or more target schema by executing the mapping program on the mapping server two or more times, wherein the mapping program is executed to define one of the two or more assignment mappings for each of the two or more target schema;
- wherein each of the two or more assignment mappings is configured to be displayed on at least one of two or more associated e-commerce websites, and wherein each of the two or more associated e-commerce websites uses one of the two or more target schema to categorize products for sale;
- wherein each assignment mapping is applied to multiple products to create listings on one of the associated e-commerce websites;
- wherein each entry in the master table has one or more product attributes from the source schema mapped to it, and each entry in the master table is mapped to one or more product attributes in each of the two or more target schema.

8. The method of claim 7, further comprising applying, using the mapping server, each of the two or more assignment mappings to the entries of the master table to map the entries to the two or more target schema, wherein each of the two or more assignment mappings is configured to be displayed on an additional e-commerce website, wherein each e-commerce website is unrelated to each other e-commerce website having a target schema, and wherein one or more attributes of the master table are mapped to one or more attributes in each of the two or more target schema.

9. The method of claim 8, further comprising mapping taxonomy information in the source schema to entries in the master table.

10. The method of claim 8, further comprising mapping entries in the master table to taxonomy fields in the two or more target schema.

11. The method of claim 8, further comprising mapping entries in the master table to product attribute fields in the two or more target schema.

12. The method of claim 8, wherein the at least one of the product attributes and taxonomy information define a product listing for at least one product offered for sale online.

13. A computer-implemented method of mapping product attributes from a source schema to two or more target schema, said method comprising:
- defining a master attribute table using a mapping server;
- defining a reverse mapping from the source schema to a master attribute list using the mapping server;
- defining two or more assignment mappings from the master attribute list to the two or more target schema using the mapping server;
- processing, by executing the mapping program on the mapping server, product attributes in the source schema to populate master attributes in the master attribute table using the reverse mapping; and
- processing, by executing the mapping program on the mapping server using the two or more assignment mappings, the master attributes in the master attribute table to define product attributes in the two or more target schema, wherein the assignment mapping is associated with a single target schema;
- wherein the product attributes in the two or more target schema are configured to be displayed on one or more e-commerce websites unrelated to each other;
- wherein each of the master attributes is mapped to one or more product attributes in each of the two or more target schema.

* * * * *